(12) United States Patent
Cho et al.

(10) Patent No.: US 11,239,502 B2
(45) Date of Patent: Feb. 1, 2022

(54) THREE-DIMENSIONAL ELECTRODE STRUCTURE AND BATTERY HAVING THE ELECTRODE STRUCTURE

(71) Applicant: Samsung Electronics Co., Ltd., Suwon-si (KR)

(72) Inventors: Kyunghoon Cho, Suwon-si (KR); Hwiyeol Park, Suwon-si (KR); Hojung Yang, Suwon-si (KR); Huisu Jeong, Suwon-si (KR); Seunghoon Nam, Suwon-si (KR); Jin S. Heo, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 361 days.

(21) Appl. No.: 15/148,449

(22) Filed: May 6, 2016

(65) Prior Publication Data
US 2017/0104235 A1    Apr. 13, 2017

(30) Foreign Application Priority Data

Oct. 12, 2015   (KR) .......................... 10-2015-0142162

(51) Int. Cl.
*H01M 10/058* (2010.01)
*H01M 4/13* (2010.01)
(Continued)

(52) U.S. Cl.
CPC ........... *H01M 10/058* (2013.01); *H01M 4/13* (2013.01); *H01M 4/131* (2013.01); *H01M 4/485* (2013.01);
(Continued)

(58) Field of Classification Search
CPC ...... H01M 10/058; H01M 4/13; H01M 1/131; H01M 10/0525; H01M 4/661;
(Continued)

(56) References Cited

U.S. PATENT DOCUMENTS

| | | | |
|---|---|---|---|
| 6,197,450 B1 * | 3/2001 | Nathan | H01G 9/016 |
| | | | 29/623.1 |
| 8,187,740 B2 | 5/2012 | Nathan et al. | |
| (Continued) | | | |

FOREIGN PATENT DOCUMENTS

| | | |
|---|---|---|
| CN | 101427415 A | 5/2009 |
| CN | 101584065 A | 11/2009 |
| (Continued) | | |

OTHER PUBLICATIONS

Merriam-Webster.com Periodic entry {https://www.merriam-webster.com/dictionary/periodic} Wayback evicence Apr. 25, 2009.*
(Continued)

*Primary Examiner* — Cynthia H Kelly
*Assistant Examiner* — Aaron J Greso
(74) *Attorney, Agent, or Firm* — Cantor Colburn LLP

(57) ABSTRACT

A three-dimensional ("3D") electrode structure includes an electrode collector plate, a plurality of active material plates disposed on the electrode collector plate and protruding from the electrode collector plate, and partition walls arranged on the electrode collector plate and substantially perpendicular to the plurality of active material plates in a plan view so as to provide structural stability of the plurality of first active material plates where the 3D electrode structure may be one of two electrode structures that are spaced apart from each other with an electrolyte layer therebetween.

20 Claims, 24 Drawing Sheets

(51) Int. Cl.
*H01M 4/131* (2010.01)
*H01M 4/485* (2010.01)
*H01M 4/66* (2006.01)
*H01M 10/0525* (2010.01)
*H01M 10/052* (2010.01)
*H01M 4/02* (2006.01)

(52) U.S. Cl.
CPC ....... *H01M 4/661* (2013.01); *H01M 10/0525* (2013.01); *H01M 10/052* (2013.01); *H01M 2004/025* (2013.01)

(58) Field of Classification Search
CPC ............... H01M 4/485; H01M 10/052; H01M 2004/025; H01M 4/66; H01M 4/48; H01M 10/105
See application file for complete search history.

(56) References Cited

U.S. PATENT DOCUMENTS

| | | | | |
|---|---|---|---|---|
| 9,166,230 | B1* | 10/2015 | Lahiri | H01M 10/4235 |
| 2004/0241540 | A1 | 12/2004 | Tsutsumi et al. | |
| 2009/0142656 | A1* | 6/2009 | Nathan | H01M 2/0202 |
| | | | | 429/129 |
| 2011/0111283 | A1 | 5/2011 | Rust, III et al. | |
| 2012/0077095 | A1 | 3/2012 | Roumi et al. | |
| 2013/0143088 | A1 | 6/2013 | Cho et al. | |
| 2014/0050969 | A1 | 2/2014 | Rust, III et al. | |
| 2014/0057169 | A1 | 2/2014 | George et al. | |
| 2014/0186698 | A1 | 7/2014 | Cobb et al. | |
| 2014/0272547 | A1 | 9/2014 | Ramasubramanian et al. | |
| 2015/0234465 | A1 | 8/2015 | Bae et al. | |
| 2016/0204464 | A1 | 7/2016 | Cho et al. | |

FOREIGN PATENT DOCUMENTS

| | | |
|---|---|---|
| CN | 103069633 A | 4/2013 |
| CN | 103098263 A | 5/2013 |
| CN | 104662714 A | 5/2015 |
| JP | 2009105063 A | 5/2009 |
| JP | 2010061861 A | 3/2010 |
| KR | 1020150020893 A | 2/2015 |
| KR | 1020160085624 A | 7/2016 |
| KR | 1020160088126 A | 7/2016 |

OTHER PUBLICATIONS

Extended European Search Report for Application No. 16191306.6 dated Dec. 6, 2016, citing the above reference(s).
Chinese Office Action for Application No. 201610885623.0 dated Jul. 21, 2020, citing the above reference(s).

* cited by examiner

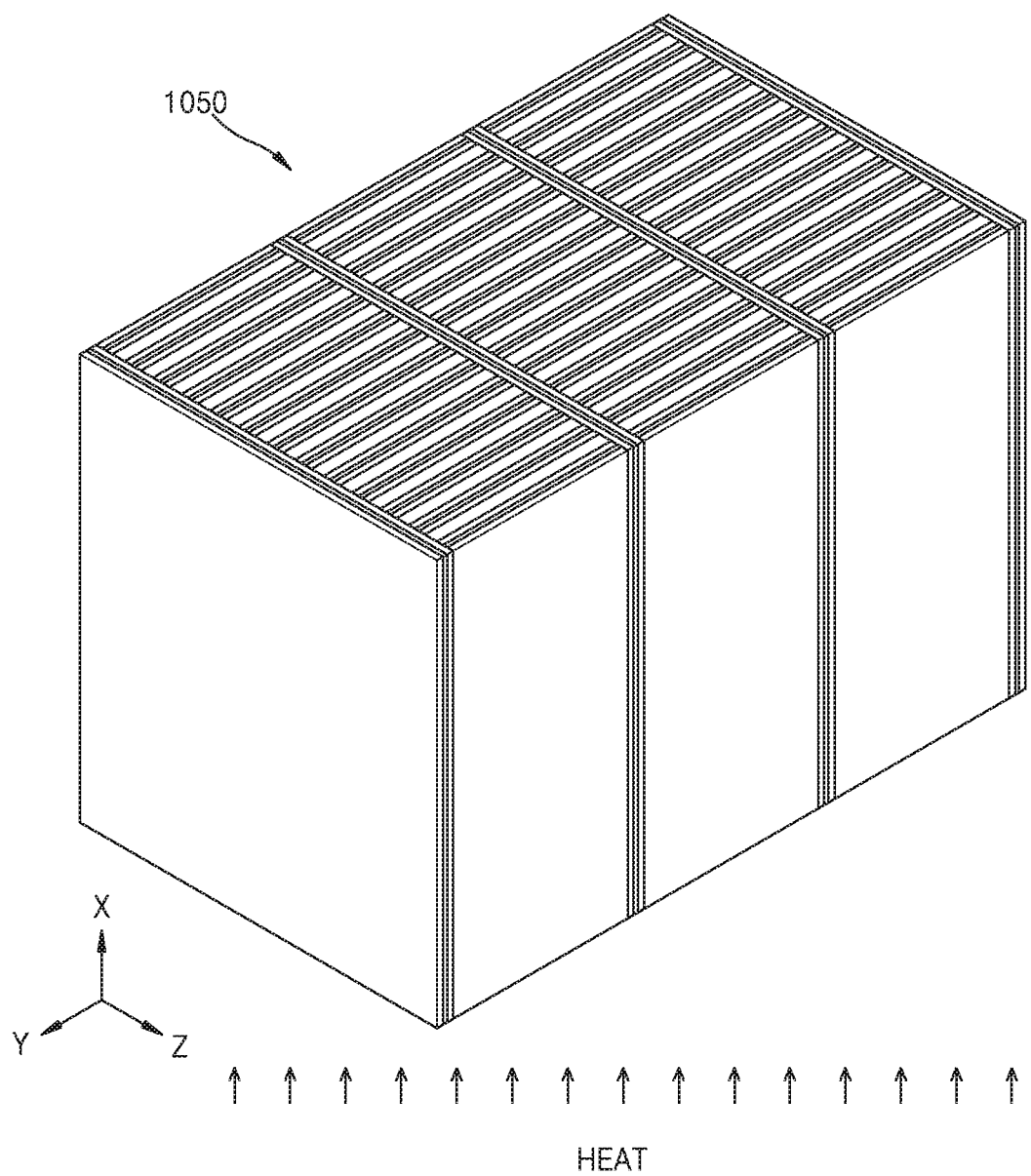

THREE-DIMENSIONAL ELECTRODE STRUCTURE AND BATTERY HAVING THE ELECTRODE STRUCTURE

CROSS-REFERENCE TO RELATED APPLICATION

This application claims priority to Korean Patent Application No. 10-2015-0142162, filed on Oct. 12, 2015, and all the benefits accruing therefrom under 35 U.S.C. § 119, the content of which in its entirety is herein incorporated by reference.

BACKGROUND

1. Field

Exemplary embodiments of the invention relate to three-dimensional electrode structures and batteries including the electrode structure.

2. Description of the Related Art

According to an advance in electronic technology, a market for mobile electronic devices such as mobile phones, game players, portable multimedia players ("PMP") or mpeg audio layer-3 ("MP3") players and various mobile electronic devices such as smart phones, smart pads, e-book terminals, tablet computers, wearable mobile medical devices is rapidly growing. Accordingly, a demand for a battery that is suitable for driving such mobile electronic devices is also increasing.

Unlike primary batteries, which are not rechargeable, secondary batteries are rechargeable and dischargeable. In particular, a lithium secondary battery has a higher voltage than that of a nickel-cadmium battery or a nickel-hydrogen battery, and has a higher energy density per unit weight. Recently, a research into providing high-capacity secondary batteries by using a three-dimensional electrode is being conducted.

SUMMARY

Provided are a three-dimensional ("3D") electrode structure and a battery including the 3D electrode structure.

Additional exemplary embodiments will be set forth in part in the description which follows and, in part, will be apparent from the description, or may be learned by practice of the presented exemplary embodiments.

According to an exemplary embodiment of an exemplary embodiment, a 3D electrode structure includes an electrode collector plate, a plurality of active material plates disposed on the electrode collector plate to protrude from the electrode collector plate, and a partition wall arranged on the electrode collector plate and substantially perpendicular to the plurality of active material plates in a plan view. The electrode structure may be understood as a 3D structure where the plurality of active material plates is disposed on the electrode collector plate to protrude from the electrode collector plate.

In an exemplary embodiment, a plurality of partition walls may be provided and arranged at equidistant intervals in a length direction of the plurality of active material plates. At least some of the partition walls may also be arranged at varying intervals along the length direction of the plurality of active material plates.

In an exemplary embodiment, the partition walls may be arranged in substantially parallel with one another. The partition walls may have a flat planar shape. In an alternative exemplary embodiment, the partition walls may have a curved planar shape.

In an exemplary embodiment, the plurality of active material plates may have a planar shape.

In an exemplary embodiment, the plurality of active material plates may be substantially perpendicular to a planar surface of the electrode collector plate, and the partition walls may be substantially perpendicular to the electrode collector plate and the plurality of active material plates. That is, the partition walls substantially perpendicular to the electrode collector plate and the plurality of active material plates may mean that the partition walls are substantially perpendicular to the planar surface of the electrode collector plate in a cross-sectional view (e.g., a side view) and also substantially perpendicular to a planar surface of the active material plates in a plan view (e.g., a top view). In other words, the partition walls are substantially perpendicular to a length direction of the plurality of active material plates. However, at least some of the partition walls may also be obliquely arranged with respect to the plurality of active material plates.

In an exemplary embodiment, the partition walls have the same height as those of the plurality of active material plates with respect to the planar surface of the electrode collector plate.

In an exemplary embodiment, the partition wall and the plurality of active material plates may include an active material of a same composition. In an alternative exemplary embodiment, the partition wall and the plurality of active material plates may include active materials of different compositions. In an alternative exemplary embodiment, the partition wall may include a non-active material.

In an exemplary embodiment, the 3D electrode structure may further include a partition wall internal collector layer disposed inside the partition wall and electrically contacting the electrode collector plate. The partition wall internal collector layer may include an electronic conductor. The electronic conductor may be, for example, a metal, a conductive polymer, a conductive ceramic or a carbon structure.

In an exemplary embodiment, the partition wall internal collector layer may have a planar shape protruding and extending from the planar surface of the electrode collector plate. The partition wall internal collector layer may be substantially perpendicular to the planar surface of the electrode collector plate. The partition wall internal collector layer may be in substantially parallel with the partition wall inside the partition wall. The partition wall internal collector layer may be inserted into the partition wall, and two surfaces of the partition wall internal collector layer may contact the partition wall. A first end portion of the partition wall internal collector layer may contact the electrode collector plate, and a second end portion of the partition wall internal collector layer opposite to the first end portion may contact an electrolyte layer or may be disposed inside the partition wall.

In an exemplary embodiment, the plurality of active material plates may be arranged on the electrode collector plate at equidistant intervals.

In an exemplary embodiment, the 3D electrode structure may further include an internal collector layer disposed at least inside the plurality of active material plates and electrically contacting the electrode collector plate. The internal collector layer may include an electronic conductor. The internal collector layer may be in substantially parallel with the planar surface of the plurality of active material plates. The internal collector layer may have a planar shape substantially perpendicularly protruding and extending from the electrode collector plate. A first end portion of the internal collector layer may contact the electrode collector plate, and a second end portion of the internal collector layer opposite to the first end portion may contact the electrolyte layer. In an alternative exemplary embodiment, the first end portion of the internal collector layer may contact the electrode collector plate, and the second end portion of the internal collector layer opposite to the first end portion may be in the plurality of active material plates.

In an exemplary embodiment, the electrode collector plate may include an electronic conductor.

In an exemplary embodiment, the 3D electrode structure may further include an active material base layer provided on a surface of the electrode collector plate, on which the plurality of active material plates are disposed.

According to an exemplary embodiment of another exemplary embodiment, a battery includes a first electrode structure, a second electrode structure spaced apart from the first electrode structure, and an electrolyte layer provided between the first electrode structure and the second electrode structure, wherein the first electrode structure may be a 3D electrode structure including an electrode collector plate, a plurality of first active material plates disposed on the electrode collector plate to protrude from the electrode collector plate, and a partition wall disposed on the electrode collector plate and substantially perpendicular to the plurality of active material plates in a plan view. The second electrode structure may also have a 3D structure facing the first electrode structure. The battery may be a rechargeable secondary battery.

According to an exemplary embodiment of another exemplary embodiment, a battery includes a first electrode structure including a first electrode collector plate, a plurality of first active material plates disposed on the first electrode collector plate to protrude from the first electrode collector plate, and a partition wall disposed on the first electrode collector plate and substantially perpendicular to the plurality of first active material plates in a plan view, a second electrode structure including a plurality of second active material plates that are alternately arranged with the plurality of first active material plates, wherein the plurality of first active material plates and the plurality of second active material plates are respectively spaced apart from each other, and an electrolyte layer provided between the first electrode structure and the second electrode structure.

In an exemplary embodiment, the second electrode structure may further include a second electrode collector plate, on which the plurality of second active material plates are disposed. The first electrode collector plate and the second electrode collector plate may face each other and be in substantially parallel with each other. The first electrode collector plate and the second electrode collector plate may be each a flat planar plate or a curved planar plate having curvature. The second electrode collector plate and the plurality of second active material plates may be provided as a single body. In an alternative exemplary embodiment, the plurality of second active material plates may be attached on the second electrode collector plate.

In an exemplary embodiment, the first electrode structure may be a cathode electrode, and the second electrode structure may be an anode electrode. In an exemplary embodiment, the plurality of first active material plates may include a cathode electrode active material including sintered ceramic having a cathode electrode composition, for example. In detail, the plurality of first active material plates may include a lithium-based cathode electrode active material. The plurality of second active material plates may include a lithium metal, silicon, carbon or an oxide anode.

In an exemplary embodiment, the electrolyte layer may include a solid electrolyte.

In an exemplary embodiment, the electrolyte layer may be provided in a serpentine form between the plurality of first active material plates and the plurality of second active material plates, between the partition walls and the plurality of second active material plates, between an end of the plurality of first active material plates and the second electrode collector plate, between an end of the partition walls and the second electrode collector plate, and between an end of the plurality of second active material plates and the first electrode collector plate. In other words, the electrolyte layer may be provided in a serpentine form along surfaces of the plurality of first active material plates and the partition walls.

In an exemplary embodiment, the first electrode structure, the electrolyte layer, and the second electrode structure may form a first battery cell layer, and a plurality of battery cell layers having the same structure as the first battery cell layer may be stacked.

According to an exemplary embodiment of another exemplary embodiment, a method of manufacturing a battery includes providing a first sheet stack structure in which at least one first active material sheet and at least one sacrificial layer are alternately stacked in a first direction, forming a first electrode stack structure in which the first sheet stack structure and a partition wall layer are alternately stacked in a second direction substantially perpendicular to the first direction, forming a first electrode collector plate on a surface of the first electrode stack structure along a normal that is substantially perpendicular both to the first and second directions, forming a first electrode structure by removing the sacrificial layer, and sequentially forming a solid electrolyte and a second electrode structure on the first electrode structure.

In an exemplary embodiment, the first active material sheet may be provided in a sheet form by heating and drying a slurry including a first active material.

In an exemplary embodiment, the first sheet stack structure may be provided by alternately and repeatedly stacking the first active material sheet, a first internal collector layer, the first active material sheet, and a sacrificial layer sheet.

In an exemplary embodiment, the sacrificial layer sheet may be provided in a sheet form by heating and drying a slurry including a sacrificial layer material.

In an exemplary embodiment, the partition wall layer may be provided in a sheet form by heating and drying a slurry including a first active material. The partition wall layer and the first active material sheet may include first active materials having a same composition. The partition wall layer and the first active material sheet may include first active materials having different compositions.

Instead of the partition wall layer, a partition wall composite sheet may be alternately stacked with the first sheet stack structure so as to form the first electrode stack structure. The partition wall composite sheet may be provided by sequentially stacking a first active material sheet, a partition wall internal collector layer, and a first active material sheet.

In an exemplary embodiment, the partition wall internal collector layer may be provided by coating the first active material sheet with a paste including a conductive material.

In an exemplary embodiment, the partition wall may be provided in a sheet form by heating and drying a slurry including a non-active material.

In an exemplary embodiment, the first electrode collector plate may be provided using a deposition method or a printing method.

In an exemplary embodiment, the providing the first electrode stack structure and the first electrode collector plate may further include cutting the first electrode stack structure in a direction substantially perpendicular to the third direction, wherein the first electrode collector plate may be disposed on a surface of the first electrode stack structure provided by the cutting.

In an exemplary embodiment, the method of manufacturing a battery may further include sintering the first electrode stack structure.

In an exemplary embodiment, the sintering the first electrode stack structure may be performed before cutting the first electrode stack structure. The sacrificial layer may be removed using an etching operation after cutting the first electrode stack structure.

In an exemplary embodiment, the sintering the first electrode stack structure may be performed after cutting the first electrode stack structure. When sintering the first electrode stack structure, the sacrificial layer may also be removed at the same time. The sacrificial layer may be removed using a burn-out operation or a melt-out operation. The removing of the sacrificial layer may include washing a residue to the sacrificial layer.

In an exemplary embodiment, the forming the first electrode collector plate may further include forming a first active material base.

BRIEF DESCRIPTION OF THE DRAWINGS

These and/or other exemplary embodiments will become apparent and more readily appreciated from the following description of the exemplary embodiments, taken in conjunction with the accompanying drawings in which.

DETAILED DESCRIPTION

Figure 1:
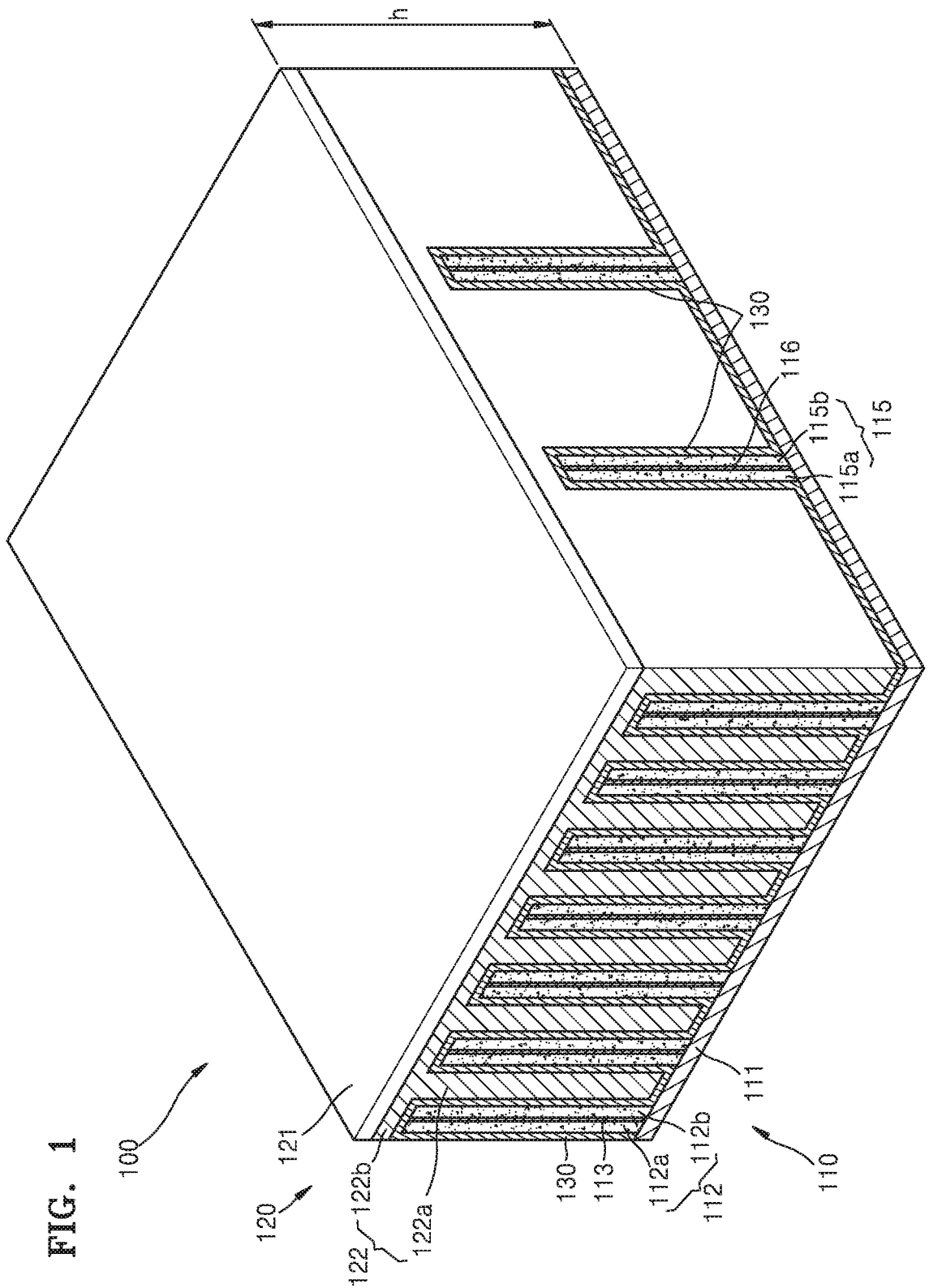
FIG. 1 is a perspective view of an exemplary embodiment of a structure of a unit cell of a battery.

Reference will now be made in detail to exemplary embodiments, examples of which are illustrated in the accompanying drawings, wherein like reference numerals refer to like elements throughout and sizes of elements in the drawings may be exaggerated for clarity and convenience of description. In this regard, the exemplary embodiments may have different forms and should not be construed as being limited to the descriptions set forth herein. Accordingly, the exemplary embodiments are merely described below, by referring to the figures, to explain exemplary embodiments. Expressions such as "at least one of," when preceding a list of elements, modify the entire list of elements and do not modify the individual elements of the list.

Also, when a predetermined material layer is described as being formed on a substrate or another layer, the material layer can be directly on the substrate or the other layer, or intervening layers may also be present. Materials of each layer according to exemplary embodiments below are exemplary, and other materials may also be used. In addition, when an element is referred to as being "above" or "on" another element in a layer structure, it can be directly above or on and contact the other element, or intervening elements may also be present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
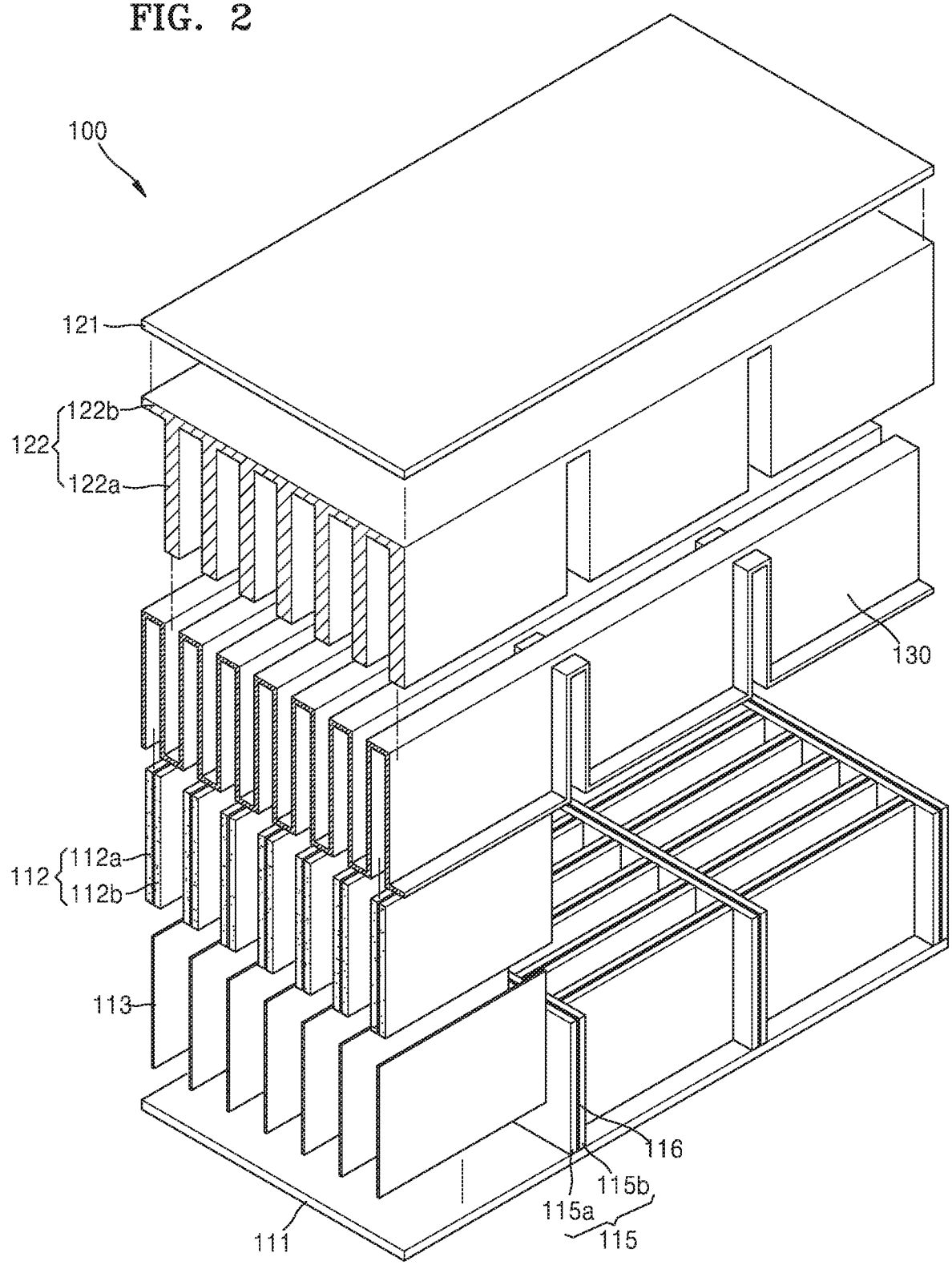
FIG. 2 is a disassembled perspective view of the structure of the unit cell of the battery illustrated in FIG. 1.
Figure 3:
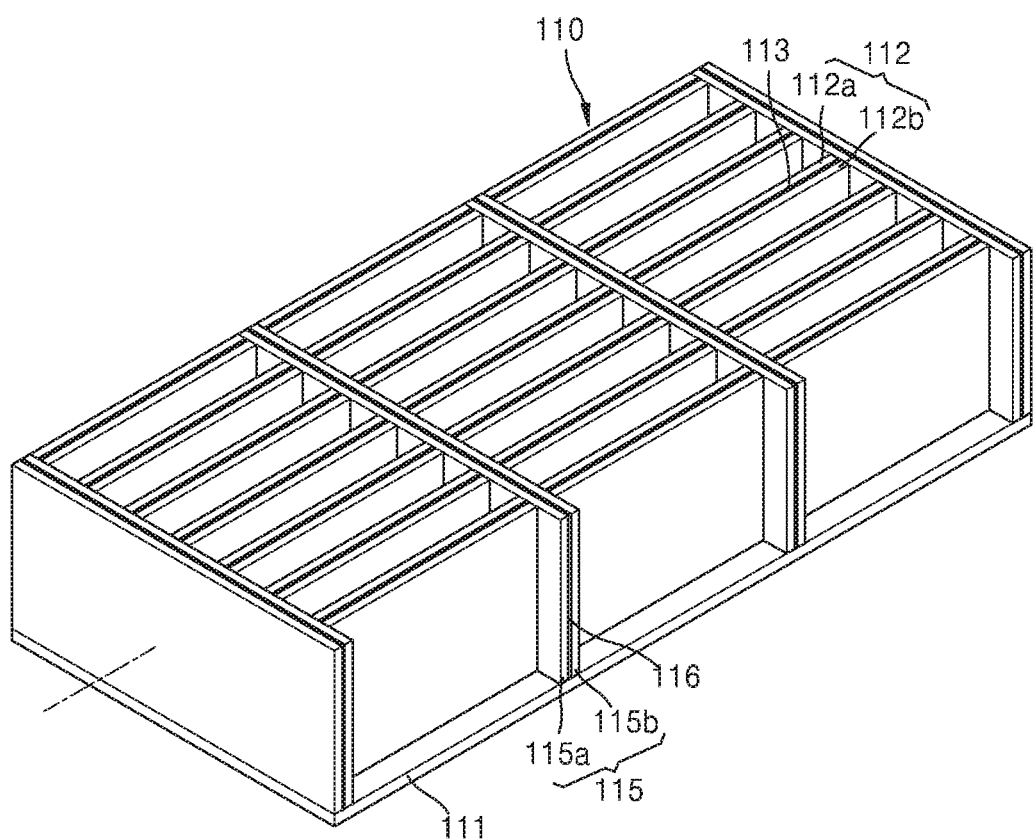
FIG. 3 is a partial perspective view only illustrating a first electrode structure of the unit cell of the battery illustrated in FIG. 1.

FIG. 1 is a perspective view of a structure of a unit cell of a battery 100 according to an exemplary embodiment. FIG. 2 is a disassembled perspective view of the structure of the unit cell of the battery 100 illustrated in FIG. 1. FIG. 3 is a partial perspective view only illustrating a first electrode structure 110 of the unit cell of the battery 100 illustrated in FIG. 1.

Referring to FIGS. 1 through 3, the battery 100 according to the exemplary embodiment may include the first electrode structure 110, which is three-dimensional ("3D"), a second electrode structure 120 facing the first electrode structure 110, and an electrolyte layer 130 disposed between the first electrode structure 110 and the second electrode structure 120.

The first electrode structure 110 may include a first electrode collector plate 111, a plurality of first active material plates 112 electrically contacting the first electrode collector plate 111, and partition walls 115 substantially perpendicular to the first active material plates 112 in a plan view.

The first electrode collector plate 111 may have a planar shape. In an exemplary embodiment, the first electrode collector plate 111 may include a conductive metal material such as Cu, Au, Pt, Ag, Zn, Al, Mg, Ti, Fe, Co, Ni, Ge, In, or Pd. The first electrode collector plate 111 may be a cathode electrode collector, for example.

The first active material plates 112 may be disposed on the first electrode collector plate 111 and protrude from the first electrode collector plate 111. The first active material plates 112 may electrically contact a surface of the first electrode collector plate 111. The first active material plates 112 may have a planar shape. The first active material plates 112 may have, for example, a ratio of height to thickness (that is, an aspect ratio) equal to or greater than about 10. In an exemplary embodiment, the first active material plates 112 may be disposed (e.g., attached) substantially perpendicular to a surface of the first electrode collector plate 111, for example. As the first active material plates 112 protrude from the surface of the first electrode collector plate 111, the first electrode structure 110 has a 3D structure so that an energy density and rate characteristics of a battery may be both increased.

The first active material plates 112 may include a combination of a first active material, a conductive material, and a binder. In an alternative exemplary embodiment, the first active material plates 112 may only include a first active material without a conductive material or a binder. The first active material may be a cathode electrode active material. In an exemplary embodiment, the first active material plates 112 may include sintered polycrystalline ceramics or single crystals having the same cathode electrode composition as $LiCoO_2$, for example.

The partition walls 115 are provided on the first electrode collector plate 111 and substantially perpendicular to the first active material plates 112 in a plan view. In an exemplary embodiment, the partition walls 115 may be disposed in a direction substantially perpendicular to a length direction of the first active material plates 112, for example. The partition walls 115 support the first active material plates 112 such that a shape of the first active material plates 112 is maintained even though the first active material plates 112 have a shape having a high aspect ratio. In an exemplary embodiment, an aspect ratio, that is, a ratio of a height to a thickness of the first active material plates 112 may be 10 or greater, for example, and when an electrode structure only includes the first active material plates 112 without the partition walls 115, the first active material plates 112 that are erected substantially perpendicularly during a manufacturing process may easily collapse or be bent due to the high aspect ratio, or even after the manufacture is completed, the first active material plates 112 may be easily deformed. In contrast, as the partition walls 115 may be provided in a direction substantially perpendicular to the first active material plates 112, the first active material plates 112 may be structurally stabilized. Also, when the battery 100 is driven, the first active material plates 112 and a second active material plate 122 expand and contract in a thickness direction thereof, and accordingly, stress is applied to the battery 100, and the partition walls 115 reduce deformation of the battery 100 due to the stress, thereby increasing a lifetime of the battery 100. In addition, the partition walls 115 may be used to provide uniform intervals between the first active material plates 112 so as to secure a uniform reaction and a charging capacity of the battery 100.

The partition walls 115 may include a first active material having the same composition as the first active material plates 112, or a first active material of a different composition from the first active material plates 112. In an exemplary embodiment, the partition walls 115 may include a combination of a cathode electrode active material, a conductive material, and a binder, or only a cathode electrode active material without a conductive material or a binder, for example. In an exemplary embodiment, the partition walls 115 may include sintered polycrystalline ceramics or single crystals having the same cathode electrode composition as $LiCoO_2$, for example. By forming the partition walls 115 of the same cathode electrode active material as the first active material plates 112, an amount (e.g., volume) of a cathode electrode active material in the battery 100 may be increased, thereby increasing an energy density of the battery 100.

The partition walls 115 may be provided at equidistant intervals along a length direction of the first active material plates 112. However, at least some of the partition walls 115 may also be provided at different intervals along the length direction of the first active material plates 112. The partition walls 115 may be disposed in substantially parallel with one another. The partition walls 115 may have a planar shape. In an alternative exemplary embodiment, the partition walls 115 may have a bent or curved plate shape. While a plurality of partition walls 115 are described according to the exemplary embodiment, only one partition wall 115 may also be provided.

The second electrode structure 120 may include a second electrode collector plate 121 facing and being in substantially parallel with the first electrode collector plate 111 and a plurality of second active material plates 122 electrically contacting the second electrode collector plate 121.

The second electrode collector plate 121 may have a planar shape that is in substantially parallel with the first electrode collector plate 111, and may be understood as an anode electrode collector plate corresponding to the first electrode collector plate 111 (e.g., cathode electrode). In an exemplary embodiment, the second electrode collector plate 121 may include a conductive metal material such as Cu, Au, Pt, Ag, Zn, Al, Mg, Ti, Fe, Co, Ni, Ge, In, or Pd.

The second active material plates 122 may include a first portion 122a having a planar shape and substantially perpendicularly protruding and extending from the second electrode collector plate 121. Furthermore, the second active material plates 122 may further include a second portion 122b facing and being in substantially parallel with the first electrode collector plate 111. The second portion 122b of the second active material plates 122 may have a planar shape contacting the second electrode collector plate 121. In another exemplary embodiment, the second portion 122b of the second active material plates 122 may be omitted, and the second active material plates 122 may only include the first portion 122a. Also, the second portion 122b of the second active material plates 122 may be understood as a portion of a second electrode collector layer as will be described later.

The second active material plates 122 may include an anode electrode active material. In an exemplary embodiment, the second active material plates 122 may include an anode electrode active material having an excellent electrical conductivity such as lithium (Li), for example. In an alternative exemplary embodiment, the second active material plates 122 may include silicon, carbon, or an oxide anode electrode, for example.

When the second active material plates 122 include an active material having excellent electrical conductivity, the second portion 122b of the second active material plates 122 may substantially function as a second electrode collector layer, and the second electrode collector plate 121 may be omitted. Furthermore, as will be described later, the electrolyte layer 130 may have a serpentine form along surfaces of the first active material plates 112 and the partition walls 115, and thus, the second active material plates 122 may also be coated along a surface of the electrolyte layer 130 in a serpentine manner instead of completely filling spaces defined by the first active material plates 112 and the partition walls 115 of the first electrode structure 110.

The first electrode structure 110 and the second electrode structure 120 are spaced apart from each other, and the electrolyte layer 130 is disposed between the first electrode structure 110 and the second electrode structure 120. In detail, the electrolyte layer 130 may be disposed between the first active material plates 112 and the second active material plates 122, between the partition walls 115 and the second active material plates 122, and between the second active material plates 122 and the first electrode collector plate 111. In an exemplary embodiment, the electrolyte layer 130 may have a serpentine shape, for example. In other words, the electrolyte layer 130 may be provided in a serpentine form along surfaces of the first active material plates 112 and the partition walls 115. Accordingly, the first active material plates 112 and the second active material plates 122 may not directly contact each other but exchange metal ions through the electrolyte layer 130. Also, the first electrode collector plate 111 may be electrically connected only to the first active material plates 112, and the second electrode collector plate 121 may be electrically connected only to the second active material plates 122. According to the illustrated exemplary embodiment, the electrolyte layer 130 may include a solid electrolyte that is fixed in a serpentine form. In an exemplary embodiment, the electrolyte layer 130 may include a solid electrolyte such as $Li_3PO_4$, $Li_3PO_{4-x}N_x$, $LiBO_{2-x}N_x$, $Li_3PO_4N_x$, $LiBO_2N_x$, $Li_4SiO_4$—$Li_3PO_4$, or $Li_4SiO_4$—$Li_3VO_4$, for example. The battery 100 according to the illustrated exemplary embodiment is described based on the electrolyte layer 130 including a solid electrolyte, but the electrolyte layer 130 may include a liquid electrolyte.

Electrical conductivity of the first active material plates 112 is usually lower than that of the first electrode collector plate 111, and thus, in order to provide a uniform ion exchange reaction between the first active material plates 112 and the second active material plates 122, first internal collector layers 113 may be respectively inserted into the first active material plates 112. In an exemplary embodiment, the first internal collector layers 113 may be electrically connected to the first electrode collector plate 111, and may be inserted into the first active material plates 112, for example.

The first internal collector layers 113 may include a different conductor material from or the same conductive material as that of the first electrode collector plate 111. While the first internal collector layers 113 having a flat planar shape are illustrated in FIG. 2, the first internal collector layers 113 do not have to be totally planar. In exemplary embodiments, the first internal collector layers 113 may have various shapes such as a fishbone shape, a mesh shape, or a lattice shape.

As the first internal collector layers 113 having a flat planar shape are respectively inserted into the first active material plates 112, two surfaces of each of the first internal collector layers 113 may contact the first active material plates 112. The first internal collector layers 113 may extend from the first electrode collector plate 111 and contact the electrolyte layer 130. That is, a first end portion of each of the first internal collector layers 113 may contact the first electrode collector plate 111, and a second end portion of each of the first internal collector layers 113 may contact the electrolyte layer 130. Then the first internal collector layers 113 may respectively completely separate the first active material plates 112 from each other. In an exemplary embodiment, each of the first active material plates 112 may be divided into two portions, namely, the first and second portions 112a and 112b, via the first internal collector layers 113, for example.

As described above, as the first internal collector layers 113 are respectively inserted into the first active material plates 112, electrons may easily transfer from an end portion of the first active material plates 112 that is close to the second electrode collector plate 121 to the first electrode collector plate 111. In an exemplary embodiment, when the first internal collector layers 113 are not present, the end portion of the first active material plates 112 that is close to the second electrode collector plate 121 is relatively far from the first electrode collector plate 111, compared to other portions of the first active material plates 112, and thus, electrons may not easily transfer from the end portion of the first active material plates 112 to the first electrode collector plate 111, for example. Accordingly, when a length of the first active material plates 112 is increased, the end portion of the first active material plates 112 may be hardly used. However, by using the first internal collector layers 113, migration of electrons from the first electrode collector plate 111 to the end portion of the first active material plates 112 that is close to the second electrode collector plate 121 may be facilitated. Thus, as metal ions may be overall uniformly exchanged between the first active material plates 112 and the second active material plates 122 through the electrolyte layer 130, the first active material plates 112 having a sufficiently long length (e.g., height) may be provided.

Likewise, partition wall internal collector layers 116 may be inserted into the partition walls 115. In an exemplary embodiment, the partition wall internal collector layers 116 may also be electrically connected to the first electrode collector plate 111, and may be inserted into the partition walls 115, for example.

The partition wall internal collector layers 116 may include a different conductor material from those of the first internal collector layers 113 and the first electrode collector plate 111, but may also include the same conductive material as those of the first internal collector layers 113 and the first electrode collector plate 111. In an exemplary embodiment, the partition wall internal collector layers 116 may include a metal, a conductive polymer, a conductive ceramic or a carbon structure, for example. The partition wall internal collector layers 116 may have a flat planar shape, like the first internal collector layers 113, but may not have a completely flat planar shape. In an exemplary embodiment, the partition wall internal collector layers 116 may have various shapes such as a fishbone shape, a mesh shape, or a lattice shape, for example.

As the partition wall internal collector layers 116 are respectively inserted into the partition walls 115, two surfaces of each of the partition wall internal collector layers 116 may contact the partition walls 115. The partition wall internal collector layers 116 may extend from the first electrode collector plate 111 and contact the electrolyte layer 130. That is, a first end portion of each of the partition wall internal collector layers 116 may contact the first electrode collector plate 111, and a second end portion of each of the partition wall internal collector layers 116 may contact the electrolyte layer 130. Then, the partition wall internal collector layers 116 may respectively completely separate the partition walls 115. In an exemplary embodiment, each of the partition walls 115 may be divided into two portions 115a and 115b via the partition wall internal collector layers 116, for example.

The partition wall internal collector layers 116 are respectively inserted into the partition walls 115, and thus, electrons may easily transfer from an end portion of the partition walls 115 that is close to the second electrode collector plate 121, to the first electrode collector plate 111.

While FIGS. 1 through 3 illustrate that the first internal collector layers 113 and the partition wall internal collector layers 116 are respectively inserted into the first active material plates 112 and the partition walls 115, this is exemplary, and the exemplary embodiment is not limited thereto. That is, the first internal collector layers 113 may be selectively provided in only some of the plurality of first active material plates 112. In addition, the partition wall internal collector layers 116 may be selectively provided in only some of the partition walls 115. In an exemplary embodiment, one first internal collector layer 113 may be inserted between every two first active material plates 112, for example.

In addition, while the first and second electrode collector plates 111 and 121 having a completely flat planar shape and the battery 100 having a perfect rectangular shape are illustrated in the exemplary embodiment described with reference to FIGS. 1 through 3, the exemplary embodiments are not limited thereto. In an alternative exemplary embodiment, the first and second electrode collector plates 111 and 121 may have a curved planar shape having a curvature and may be arranged in substantially parallel with one another to form a bent rectangular shape of a battery. The battery having a bent form may be applied to various electronic devices having a curved surface.

According to the illustrated exemplary embodiment, the plurality of first and second active material plates 112 and 122, which are independent of and substantially parallel to one another, is alternately arranged between the first and second electrode collector plates 111 and 121 in a direction substantially perpendicular to surfaces of the first and second electrode collector plates 111 and 121. Thus, an energy density and rate characteristics of the battery 100 may be both improved. In an exemplary embodiment, even when heights of the first and second active material plates 112 and 122 are increased to increase a height h of unit cells of the battery 100, a reaction area is also increased in proportion to the height h, and thus, high rate characteristics may be maintained, for example. In addition, when the height h of the unit cells of the battery 100 is increased, a fraction of the first and second active material plates 112 and 122 may be increased in the battery 100 so that an energy density of the battery 100 is also increased. Also, both a usage time of the battery 100 may be increased and a charging speed thereof may be increased. In addition, as a solid electrolyte is used, the battery 100 according to the illustrated exemplary embodiment may have high battery stability. Unit cells of the battery 100 having a small size may also be provided, and thus may be appropriate as a battery of a compact device such as a mobile device or a wearable device.

While the first electrode structure 110 is a cathode electrode and the second electrode structure 120 is an anode electrode in the above-described exemplary embodiment, the exemplary embodiments are not limited thereto. That is, contrary to this, the first electrode structure 110 may be an anode electrode, and the second electrode structure 120 may be a cathode electrode, for example.

Figure 4:
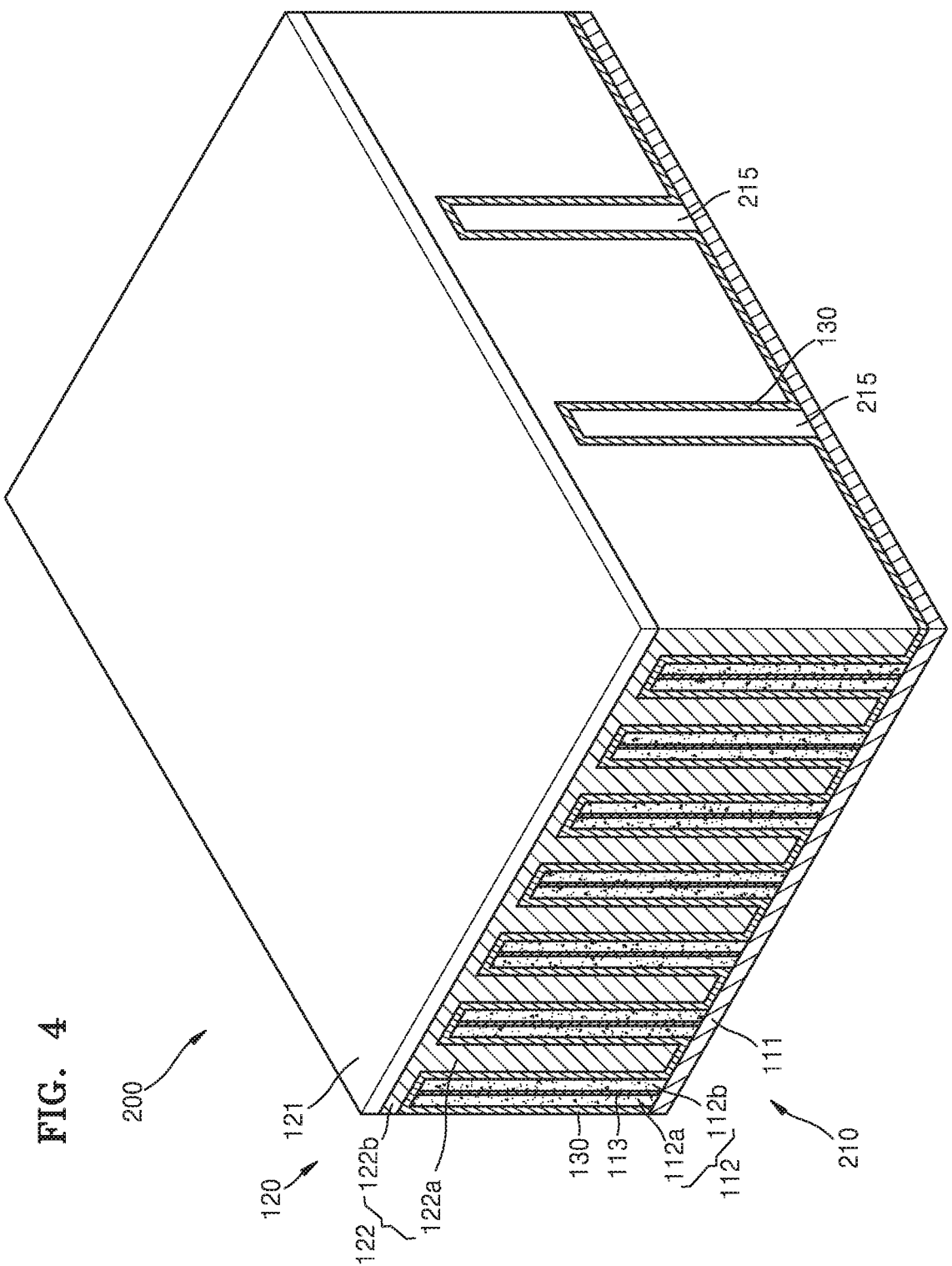
FIG. 4 is a perspective view of another exemplary embodiment of a structure of a unit cell of a battery.

FIG. 4 is a perspective view of a structure of a unit cell of a battery 200 according to another exemplary embodiment. The battery 200 illustrated in FIG. 4 is different from the battery 100 described with reference to FIGS. 1 through 3 in that the partition wall internal collector layer 116 (refer to FIG. 1) is omitted. The other structure of the battery 200 of FIG. 4 except for partition walls 215 may be the same as that of the battery 100 of FIGS. 1 through 3. When the partition walls 115 (refer to FIG. 1) include an active material having a sufficiently high electrical conductivity, even though the partition wall internal collector layer 116 is omitted, electrons may easily transfer from an end portion of the partition walls 115 close to the second electrode collector plate 121 to the first electrode collector plate 111 of the first electrode structure 210, and thus, the partition wall internal collector layer 116 may be omitted.

While the first internal collector layer 113 is illustrated as contacting the electrolyte layer 130 in FIG. 4, the first internal collector layers 113 may not contact the electrolyte layer 130 according to another exemplary embodiment.

Figure 5:
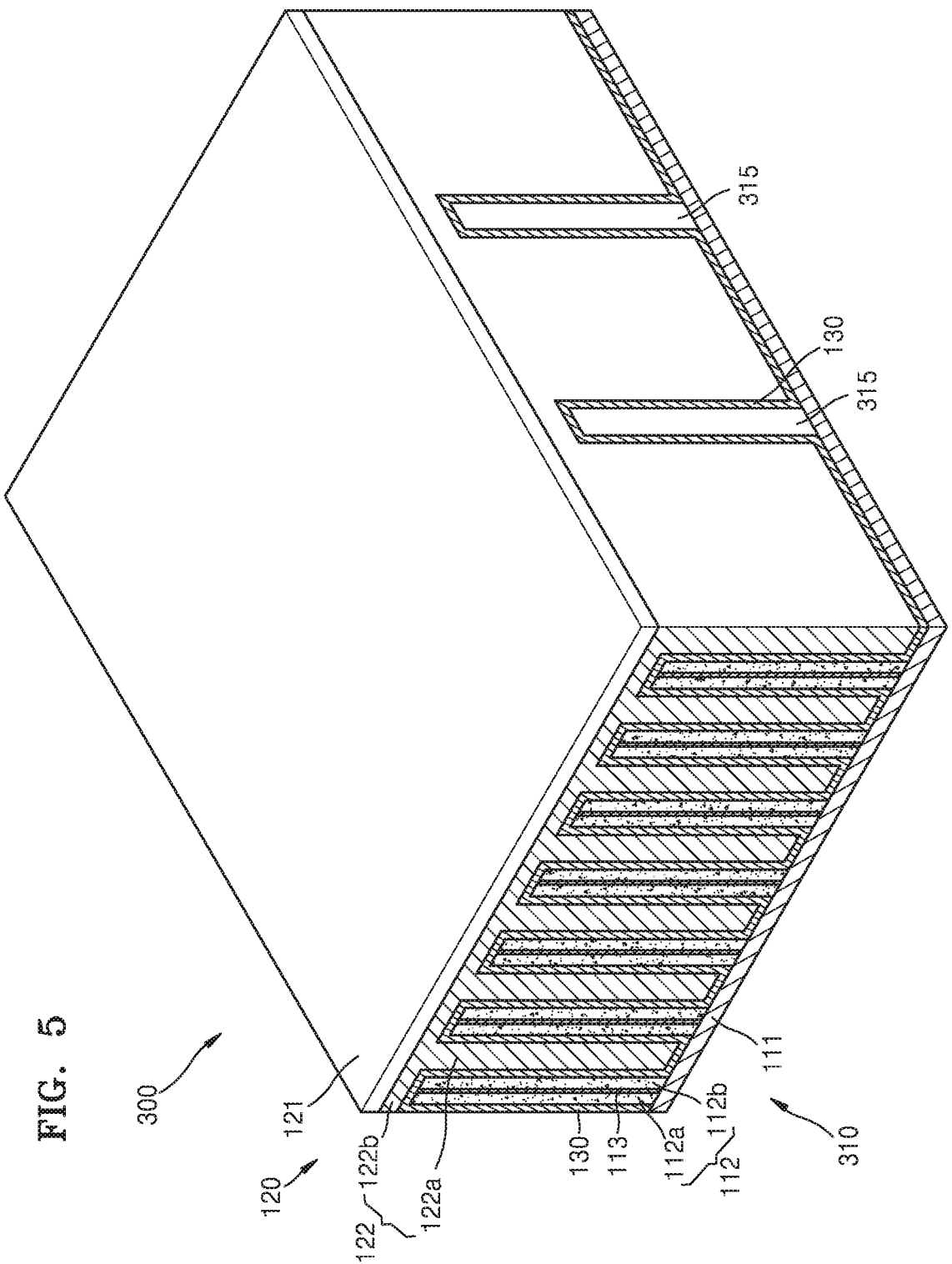
FIG. 5 is a perspective view of another exemplary embodiment of a structure of a unit cell of a battery.

FIG. 5 is a perspective view of a structure of a unit cell of a battery 300 according to another exemplary embodiment.

The battery 300 illustrated in FIG. 5 is different from the battery 200 of FIG. 4 in that a partition wall 315 of the first electrode structure 310 includes a non-active material. As the partition wall 315 may include any material without limitation to an active material, a material having a good property such as rigidity or a material that is advantageous in terms of the manufacturing process may be used.

Figure 6:
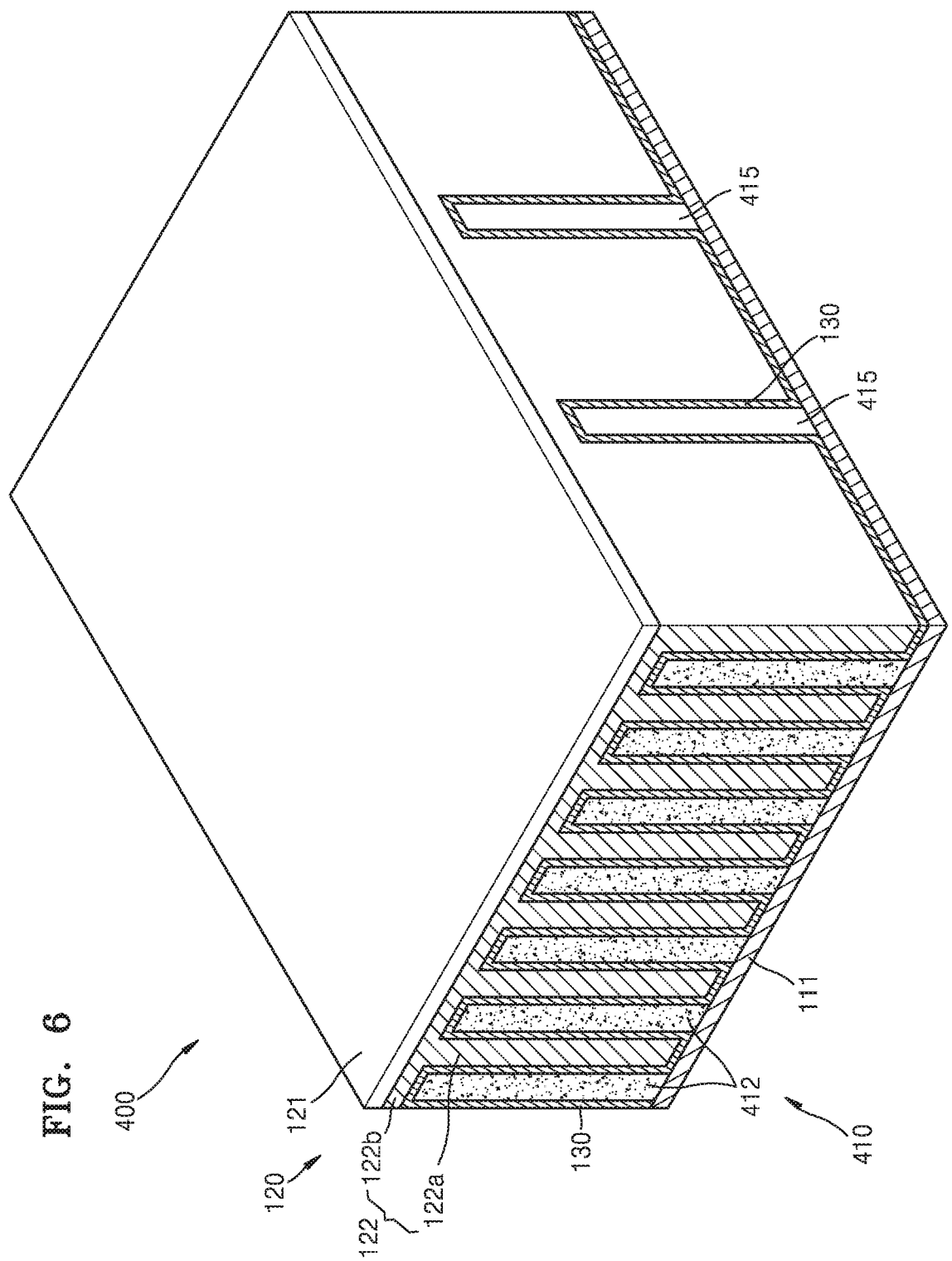
FIG. 6 is a perspective view of another exemplary embodiment of a structure of a unit cell of a battery.

FIG. 6 is a perspective view of a structure of a unit cell of a battery 400 according to another exemplary embodiment.

The battery 400 illustrated in FIG. 6 is different from the batteries 200 and 300 respectively described with reference to FIGS. 4 and 5 in that the first internal collector layer 113 is omitted. When first active material plates 412 of the first electrode structure 410 include an active material having a sufficiently high electrical conductivity, the first internal collector layer 113 may be omitted. A partition wall 415 may include a homogeneous active material as that of the first active material plates 412 or a non-active material.

Figure 7:
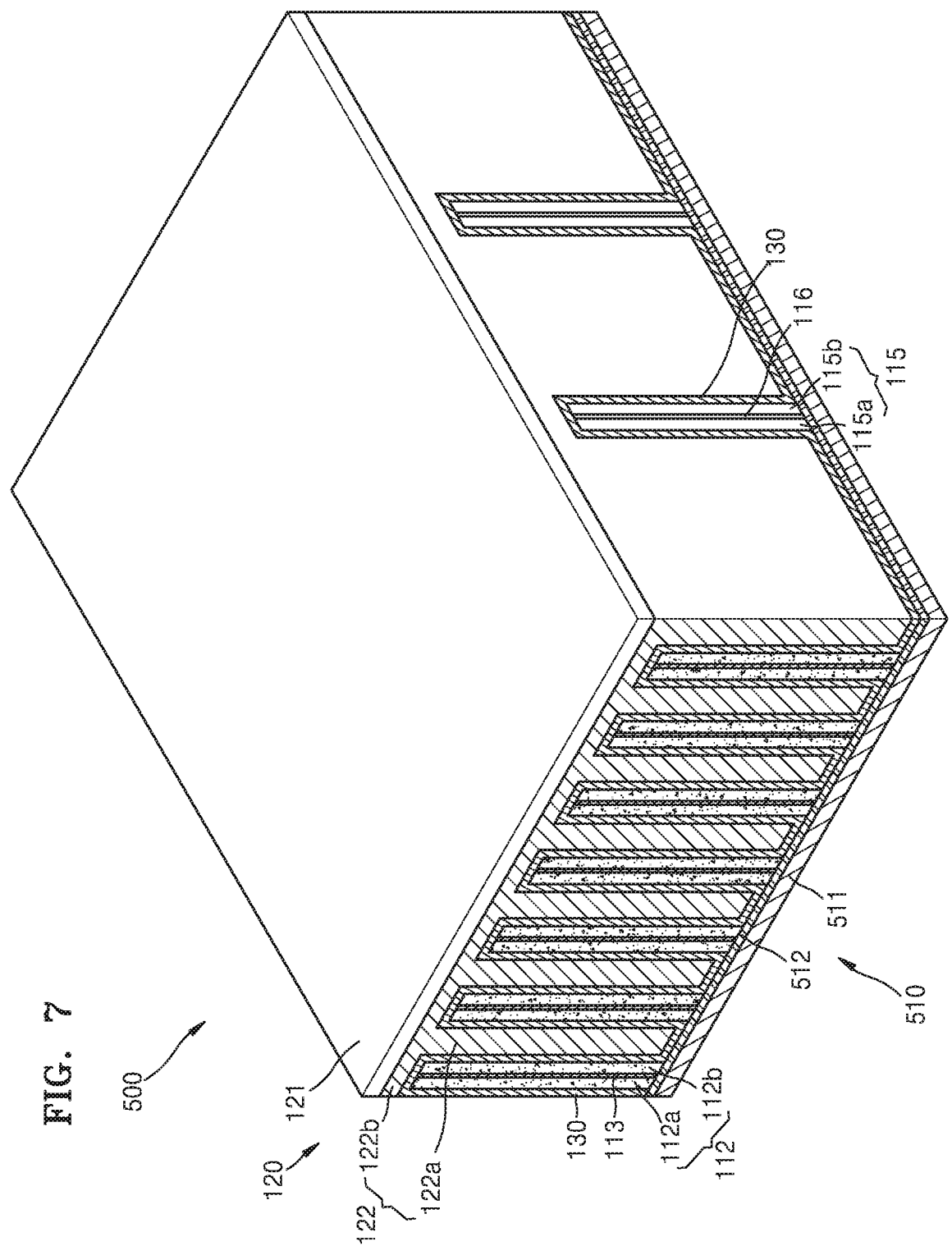
FIG. 7 is a perspective view of another exemplary embodiment of a structure of a unit cell of a battery.

FIG. 7 is a perspective view of a structure of a unit cell of a battery 500 according to another exemplary embodiment.

Compared to the batteries 100, 200, 300, and 400 described with reference to FIGS. 1 through 6, the battery 500 illustrated in FIG. 7 is different in that a first electrode structure 510 further includes a first active material base layer 512 including a first active material in addition to a first collector layer 511 including a conductive material. The first collector layer 511 may be understood as a first electrode collector plate. By forming a first active material (e.g., cathode electrode active material) also on a bottom surface of the battery 500, an amount (e.g., volume) of the first active material (e.g., cathode electrode active material) in the battery 500 may be increased, thereby increasing an energy density of the battery 500. The first internal collector layer 113 may pass through the first active material base layer 512 to electrically contact the first collector layer 511. In an exemplary embodiment, the first internal collector layer 113 may be omitted.

Figure 8:
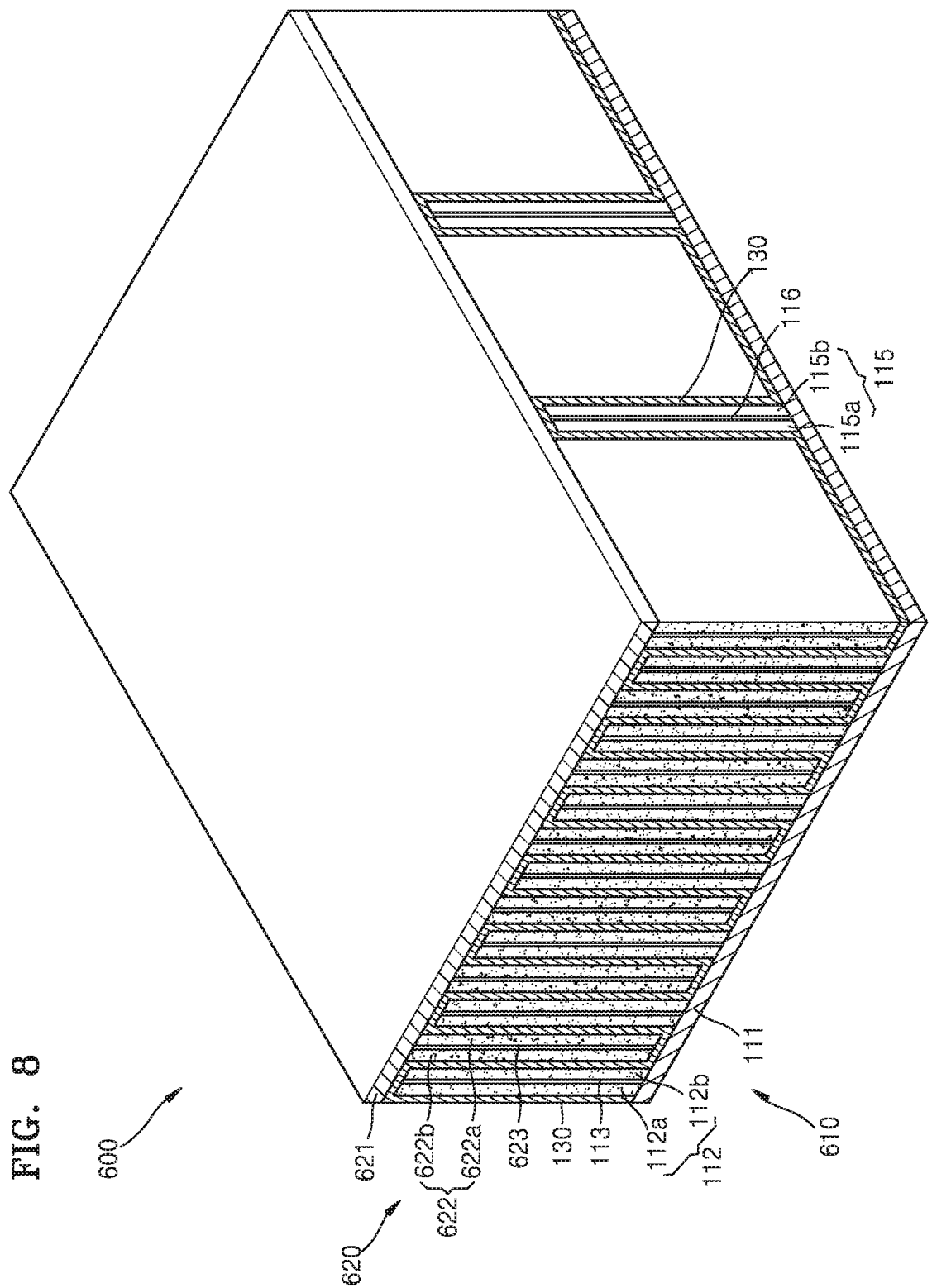
FIG. 8 is a perspective view of a structure of another exemplary embodiment of a unit cell of a battery.
Figure 9:
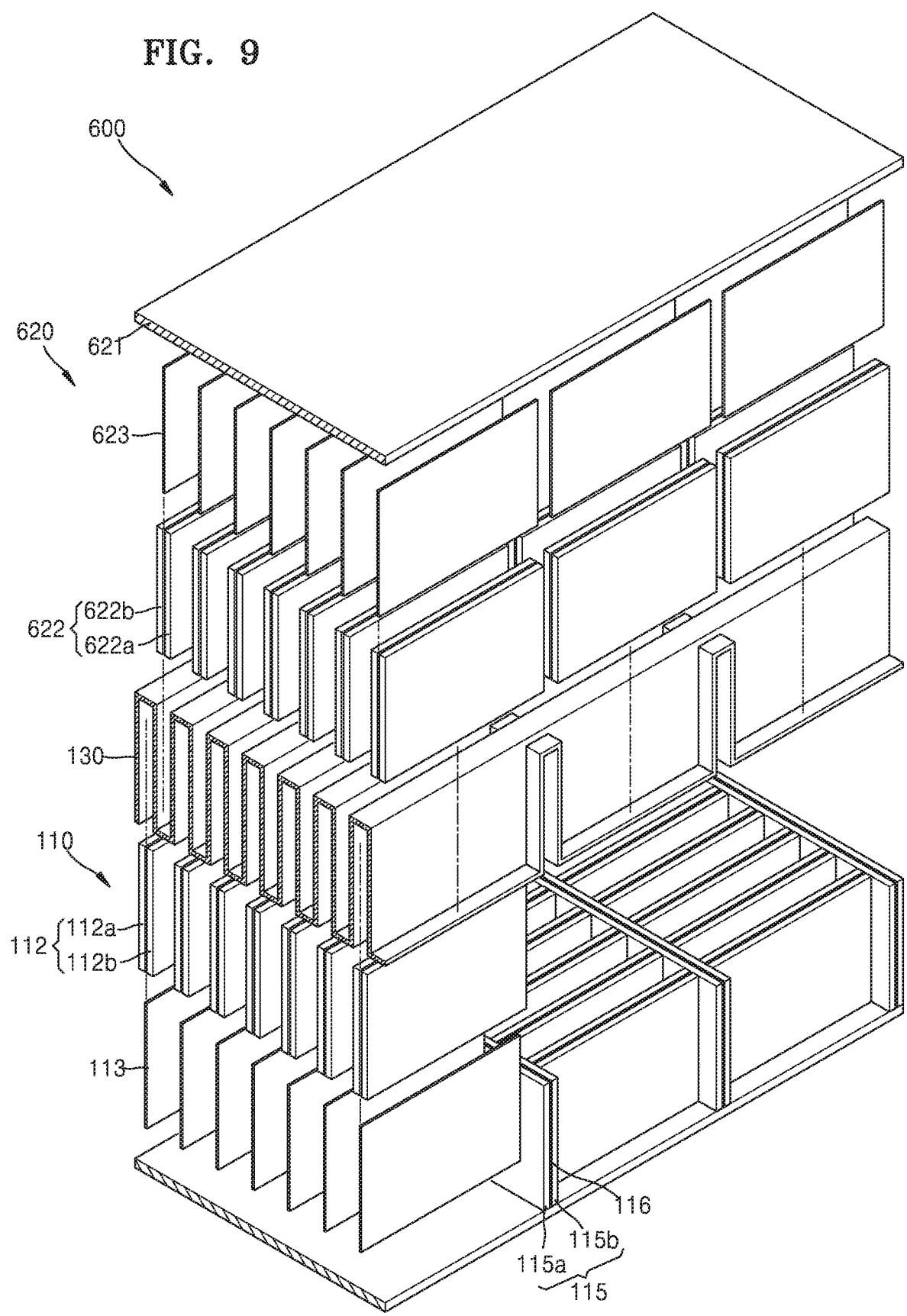
FIG. 9 is a disassembled perspective view of the structure of the unit cell of the battery illustrated in FIG. 8.

FIG. 8 is a perspective view of a structure of a unit cell of a battery 600 according to another exemplary embodiment. FIG. 9 is a disassembled perspective view of the structure of the unit cell of the battery illustrated 600 in FIG. 8. Referring to FIGS. 8 and 9, the battery 600 according to the exemplary embodiment is different from the batteries 100, 200, 300, 400, and 500 described with reference to FIGS. 1 through 7 in that a second internal collector layer 623 is inserted into a second active material plate 622 of a second electrode structure 620. The first active material plate 622 may be divided into two portions, namely, the first and second portions 622a and 622b. When the second active material plates 622 include an active material having a relatively low electrical conductivity, electron transfer may be facilitated by using the second internal collector layer 623 so that, for example, even up to an end portion of the second internal collector layer 623 is sufficiently utilized. A second electrode collector plate 621 may be similar to the second electrode collector plate 121 in FIG. 1. That is, the second electrode collector plate 621 may be substantially parallel to the first electrode collector plate 111 of a first electrode structure 610.

Figure 10:
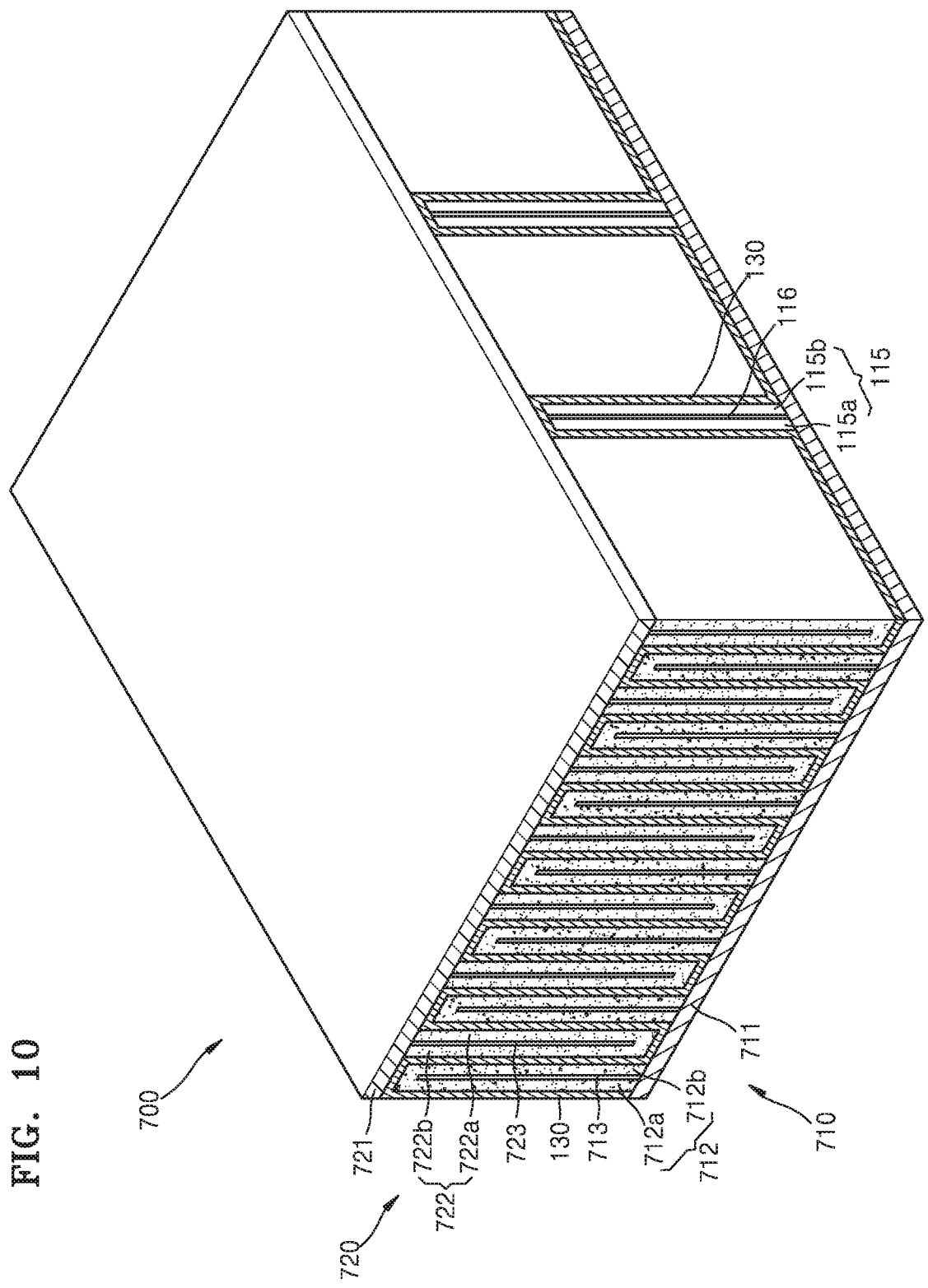
FIG. 10 is a perspective view of another exemplary embodiment of a structure of a unit cell of a battery.

FIG. 10 is a perspective view of a structure of a unit cell of a battery 700 according to another exemplary embodiment. Like in the exemplary embodiment described with reference to FIGS. 8 and 9, first and second internal collector layers 713 and 723 respectively extend from first and second electrode collector plates 711 and 721 up to the electrolyte layer 130 and contact the electrolyte layer 130. Thus, the first and second internal collector layers 713 and 723 may respectively completely separate the first and second active material plates 112 and 122. However, as shown in FIG. 10, the first and second internal collector layers 713 and 723 extend close to the electrolyte layer 130 but may not directly contact the electrolyte layer 130. In this case, two portions 712a and 712b of the first active material plate 712 respectively contacting two surfaces of the first internal collector layer 713 may not be completely divided but remain connected in an area adjacent to the electrolyte layer 130. Likewise, the two portions 722a and 722b of the second active material plate 722 respectively contacting two surfaces of the second internal collector layer 723 may not be completely divided but remain connected in an area adjacent to the electrolyte layer 130. While FIG. 10 illustrates that the first and second internal collector layers 713 and 723 both do not contact the electrolyte layer 130, one of the first and second internal collector layers 713 and 723 may contact the electrolyte layer 130 and the other may not contact the electrolyte layer 130, for example. The same may apply to the partition walls 115 and the partition wall internal collector layers 116. That is, the partition wall internal collector layers 116 may contact the electrolyte layer 130, but is not limited thereto. At least one of the partition wall internal collector layers 116 may not contact the electrolyte layer 130.

Figure 11:
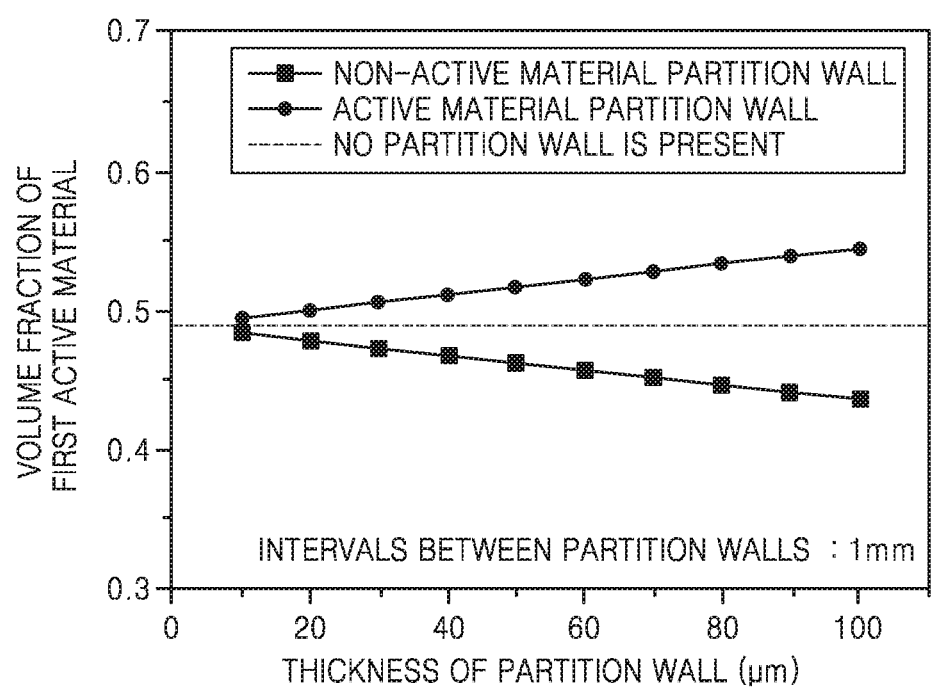
FIG. 11 is a graph showing an exemplary embodiment and a comparative example of a relationship between a partition wall thickness and a volume fraction of an active material.
Figure 12:
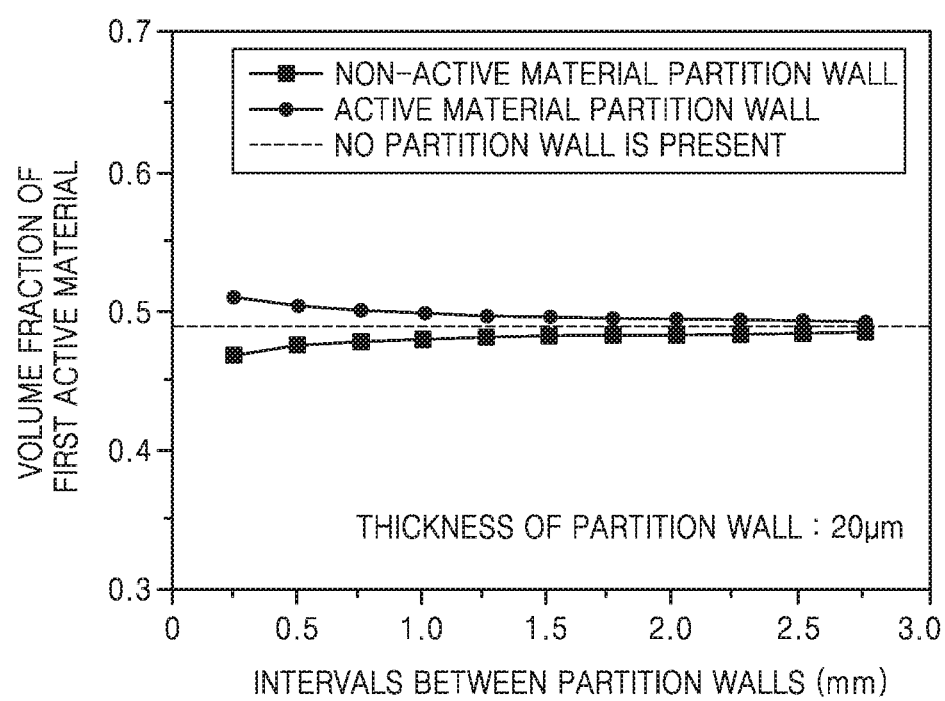
FIG. 12 is a graph showing an exemplary embodiment and a comparative example of a relationship between intervals between partition walls and a volume fraction of an active material.

FIG. 11 is a graph showing a relationship between a partition wall thickness and a volume fraction of an active material according to an exemplary embodiment and a comparative example. FIG. 12 is a graph showing a relationship between an interval between partition walls and a volume fraction of an active material according to an exemplary embodiment and a comparative example. In each graph, a first example corresponds to an example where a partition wall includes a first active material as in the battery 200 described with reference to FIG. 4, and a second example corresponds to an example where a partition wall includes a non-active material as in the battery 300 described with reference to FIG. 5. In the comparative example, no partition wall is included. Both in the exemplary embodiment and the comparative example, it is assumed that a thickness of one side of a first active material plate (for example, the portion 112a of FIG. 1) is about 10 micrometers (μm), and a thickness of a first internal collector is about 1 μm, and a height of the first active material plate is about 200 μm, and a thickness of empty space between the first active material plates is about 20 μm, and dimensions of the entire battery cell is 30 millimeters (mm)×11 mm, for example. A volume fraction of the first active material is calculated using a function between a thickness of the partition walls and an interval between the partition walls. The volume fraction of the active material is directly related to a volume energy density of a battery.

First, referring to FIG. 11, a volume fraction of the first active material when an interval between the partition walls of the first and second exemplary embodiments is 1 mm, and a thickness of the partition walls is between about 10 μm and about 100 μm, for example. In the comparative example, as no partition wall is included, it may be understood that there is no change in a volume fraction of the first active material as indicated by a dotted line. According to the first exemplary embodiment, when the thickness of the partition walls is increased, a volume fraction of the first active material is gradually increased. As described above, when the volume fraction of the first active material is increased, an energy density of energy that a battery may charge may be gradually increased. According to the second exemplary embodiment, when the thickness of the partition walls is increased, a volume fraction of the first active material may be gradually reduced.

Next, when referring to FIG. 12, a volume fraction of the first active material is shown when a thickness of the partition walls of the first and second exemplary embodiments is about 20 μm, and an interval between the partition walls is between about 0.25 mm and about 3.0 mm, for example. In the comparative example, as no partition wall is included, it may be understood that there is no change in a volume fraction of the first active material as indicated by a dotted line. According to the first exemplary embodiment, when the interval between the partition walls is increased, a volume fraction of the first active material may be gradually reduced. According to the second exemplary embodiment, when the interval between the partition walls is reduced, a volume fraction of the first active material may be gradually increased.

Referring to FIGS. 11 and 12, when a thickness between the partition walls is about 20 μm, and an interval between the partition walls is about 1 mm, a variation in the volume fraction of the first active material is about ±2 percent (%) compared to when no partition wall is included. Even when a partition wall is included, the variation of the volume fraction of the first active material may be reduced to be ±2% or less, and thus, design dimensions of batteries which have been designed without considering a partition wall may be used without a great change, and a high energy density may be provided.

Figure 13:
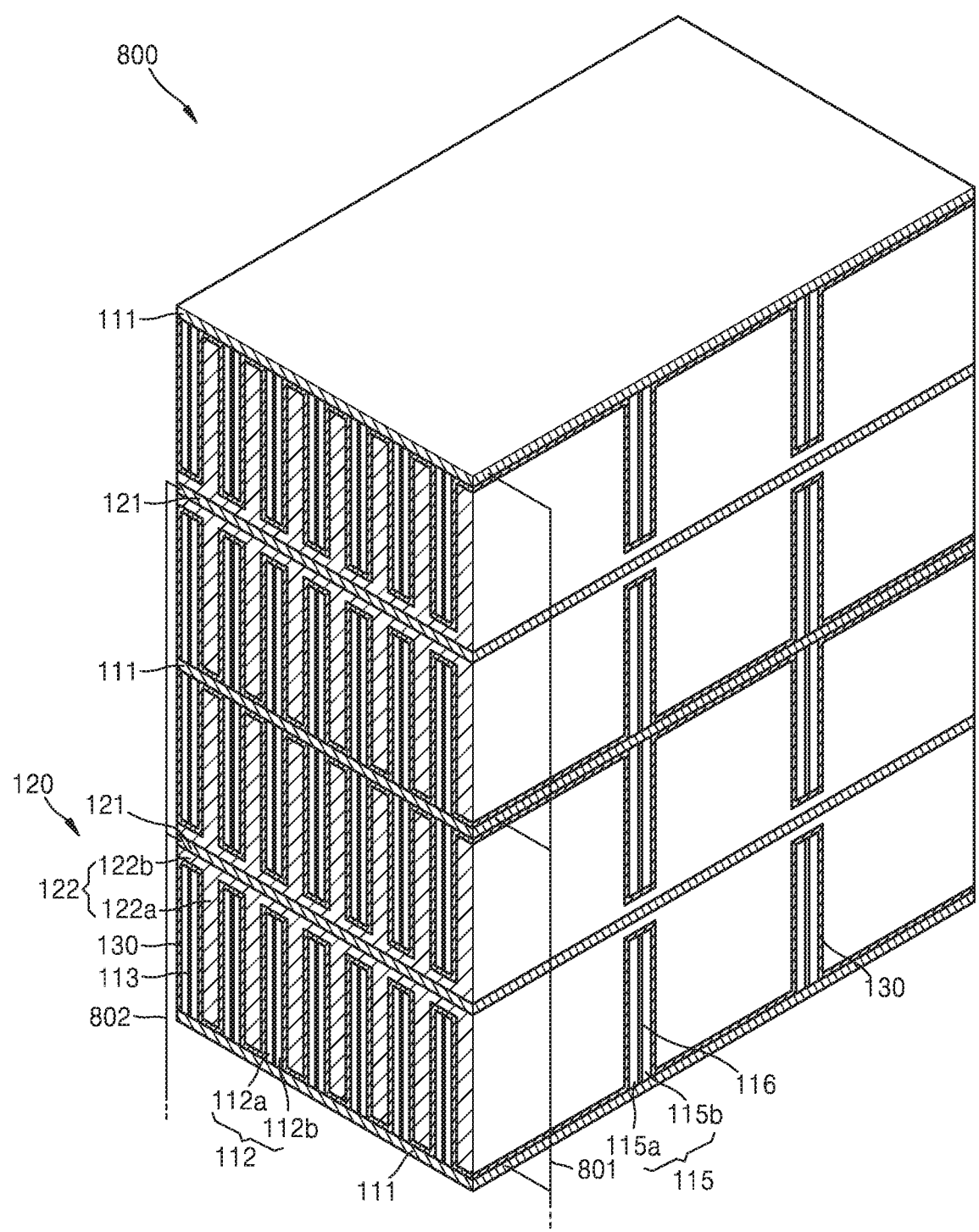
FIG. 13 is a perspective view illustrating an exemplary battery having a stacked structure provided by stacking single-layer unit cells of the battery illustrated in FIG. 1.

FIG. 13 is a perspective view illustrating a battery 800 having a stacked structure provided by stacking single-layer unit cells of the battery 100 illustrated in FIG. 1, according to an exemplary embodiment. Referring to FIG. 13, when stacking a plurality of unit cells of the battery 800, the unit cells of the batteries 100 may be disposed such that electrode collector plates of the same type contact each other. In an exemplary embodiment, a first electrode collector plate 111 of a unit cell of one battery 100 may contact a first electrode collector plate 111 of a unit cell of another battery 100, and a second electrode collector plate 121 of a unit cell of one battery 100 may contact a second electrode collector plate 121 of a unit cell of another battery 100, for example. Then, by connecting a first wire 801 to the first electrode collector plates 111 and a second wire 802 to the second electrode collector plates 121, the unit cells of the plurality of batteries 100 that are stacked may be electrically connected in substantially parallel with one another.

The batteries 100, 200, 300, 400, 500, 600, 700, and 800 according to the above-described exemplary embodiments may be rechargeable secondary batteries.

Next, a method of manufacturing the batteries according to the above-described exemplary embodiments will be described below.

Figure 14A:
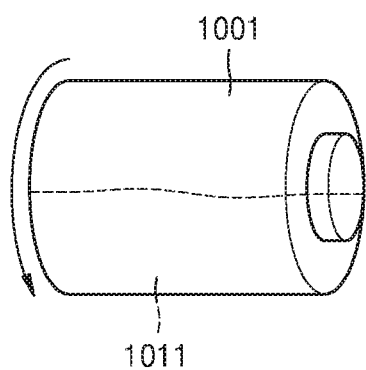
FIGS. 14A through 14N illustrate an exemplary embodiment of a method of manufacturing the battery of FIG. 1.
Figure 14B:
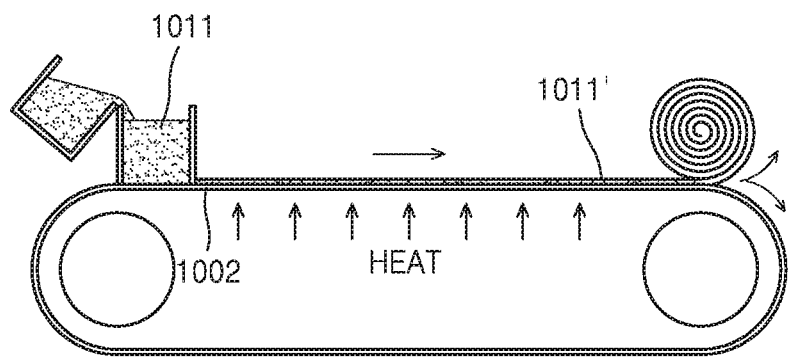
Figure 14C:
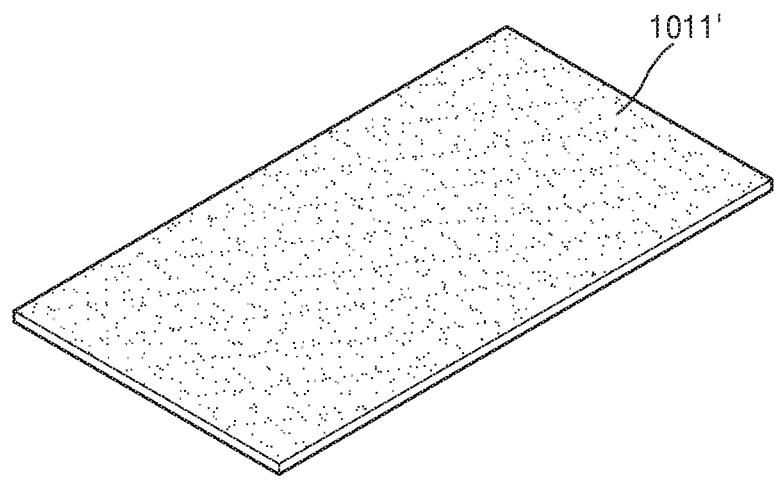
Figure 14D:
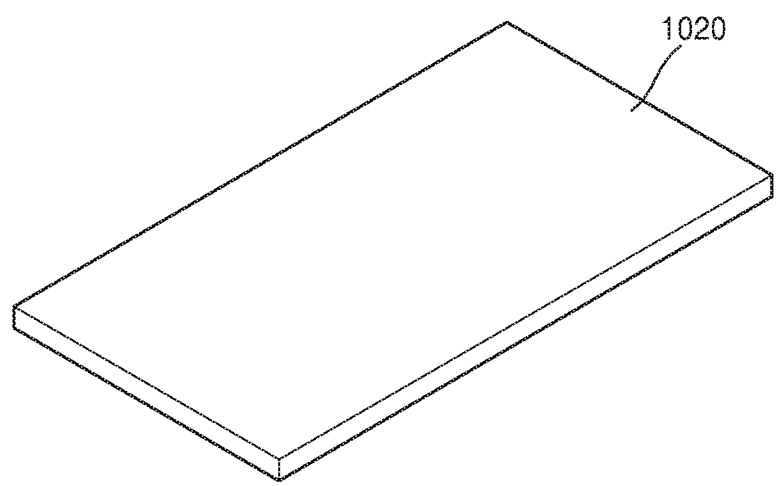
Figure 14E:
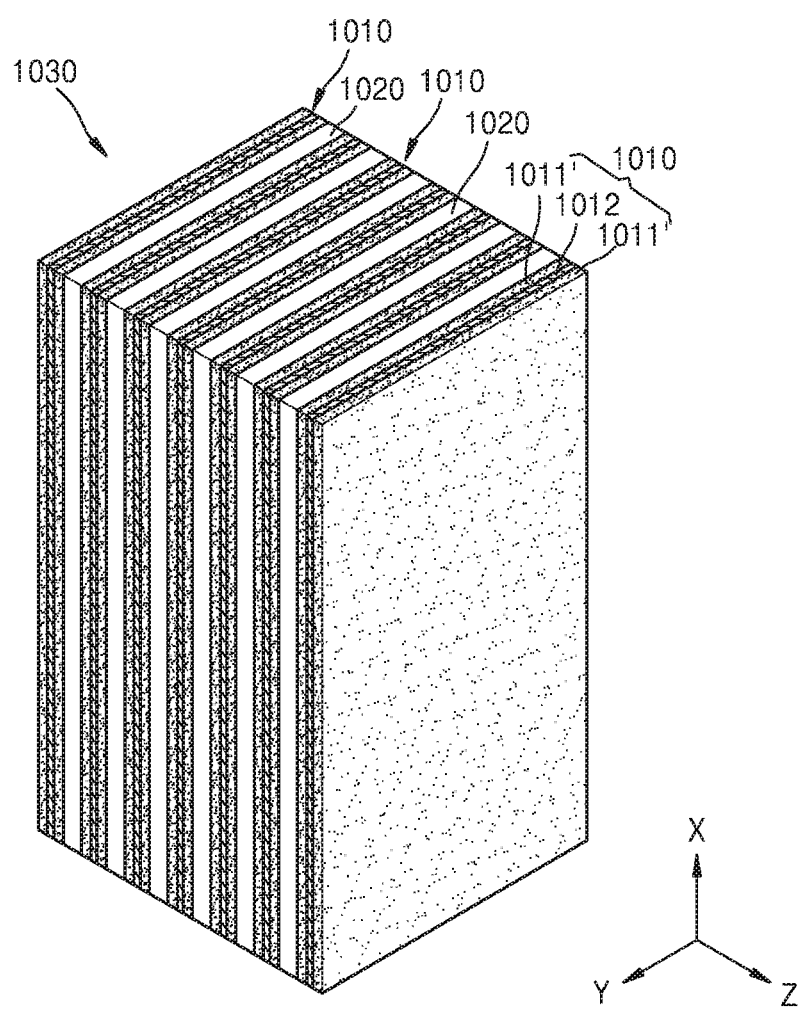
Figure 14F:
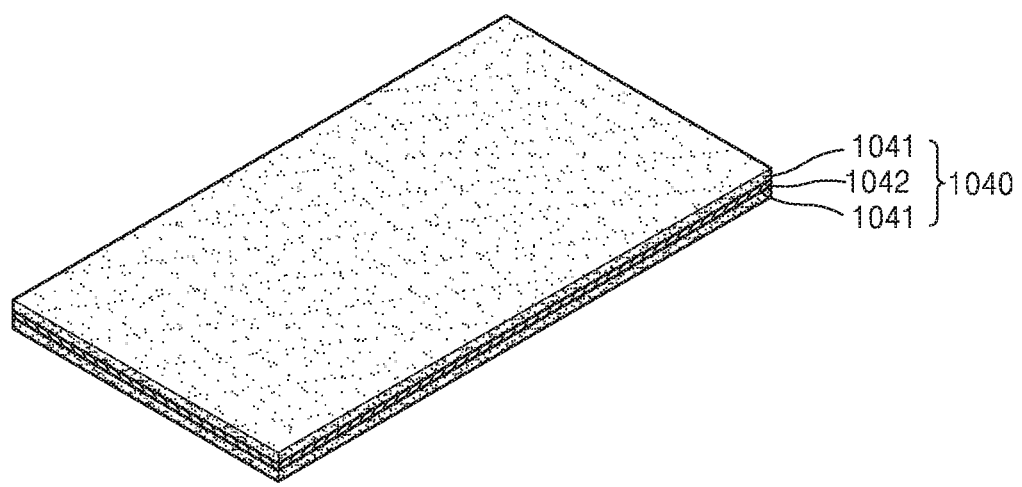
Figure 14G:
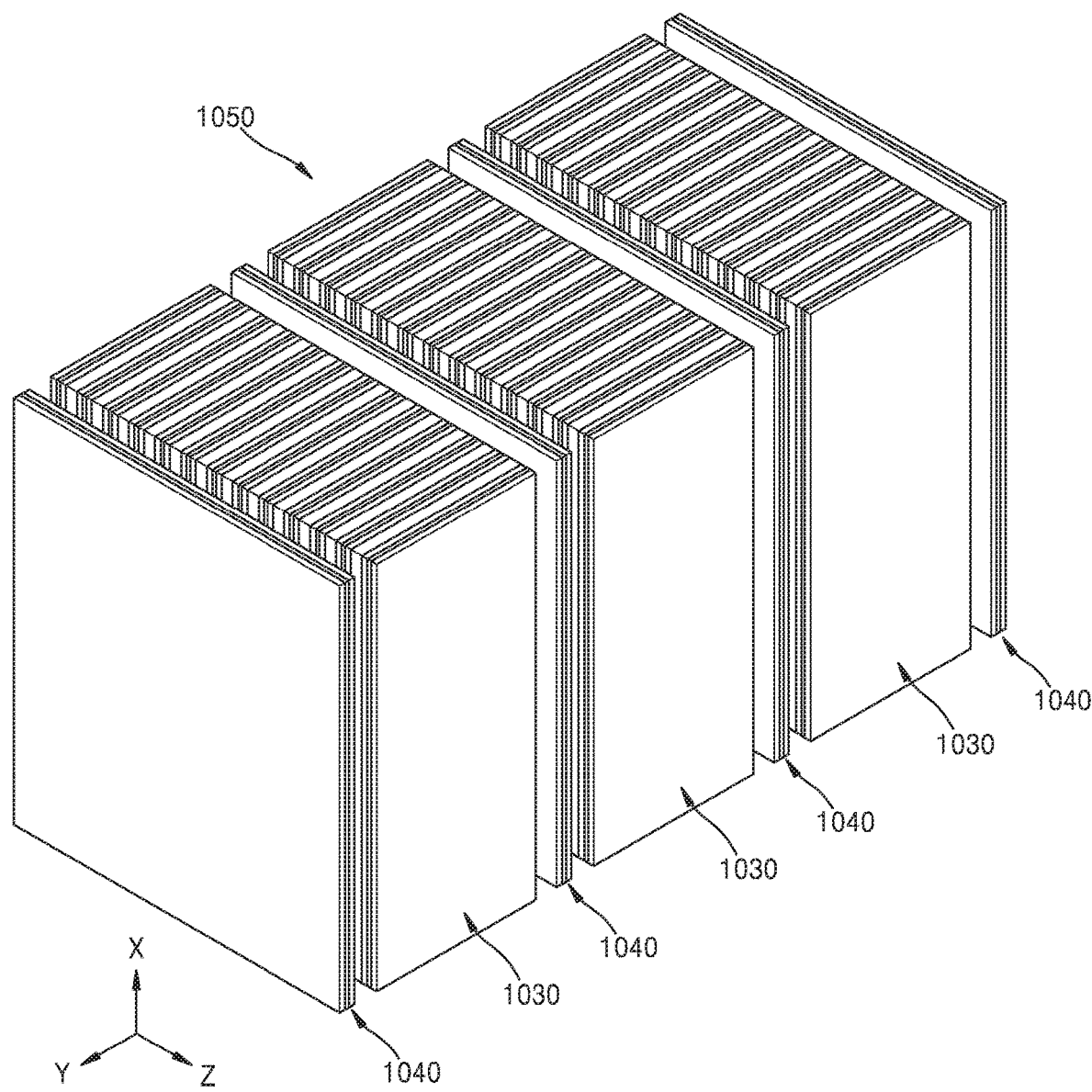
Figure 14I:
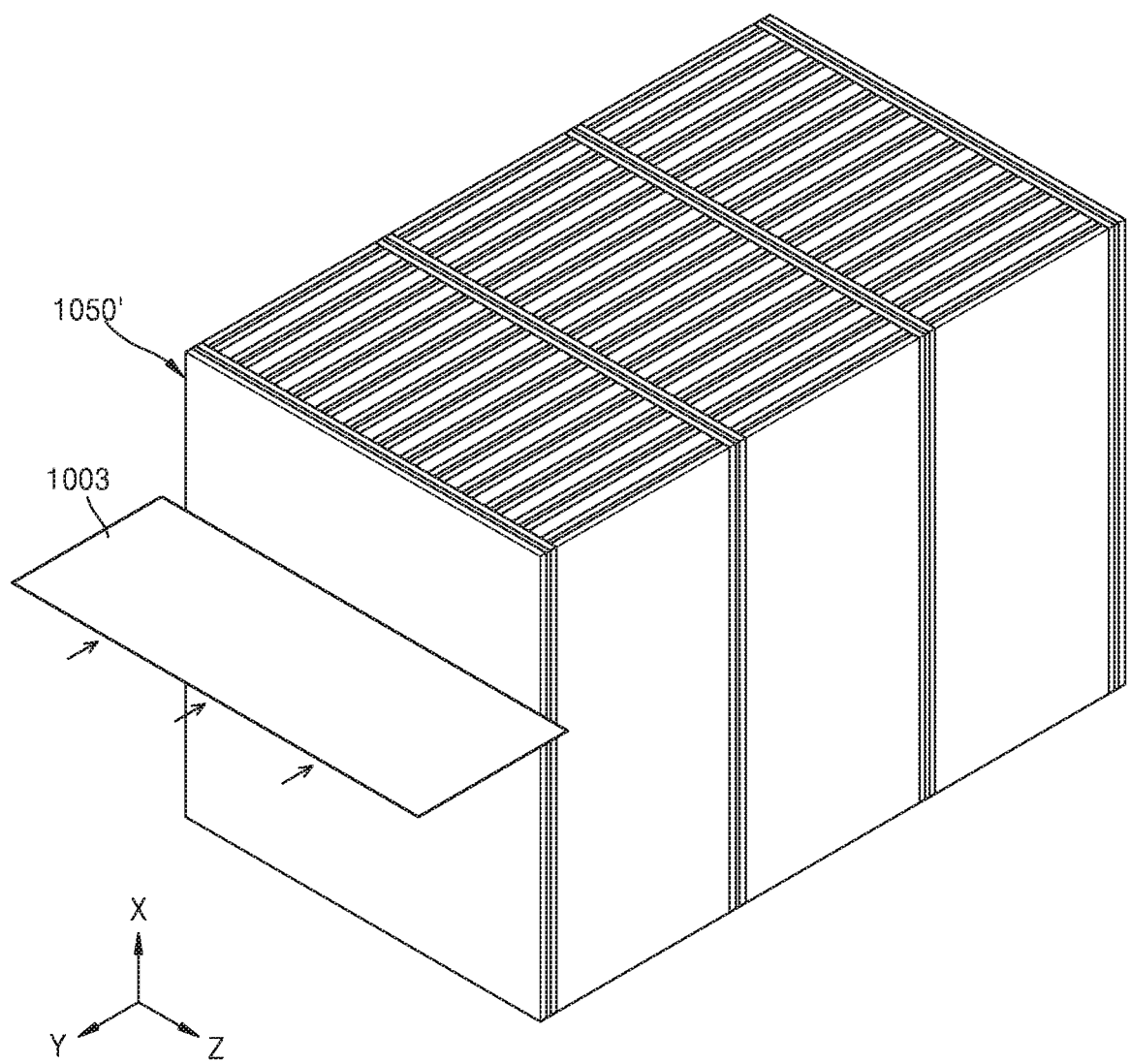
Figure 14J:
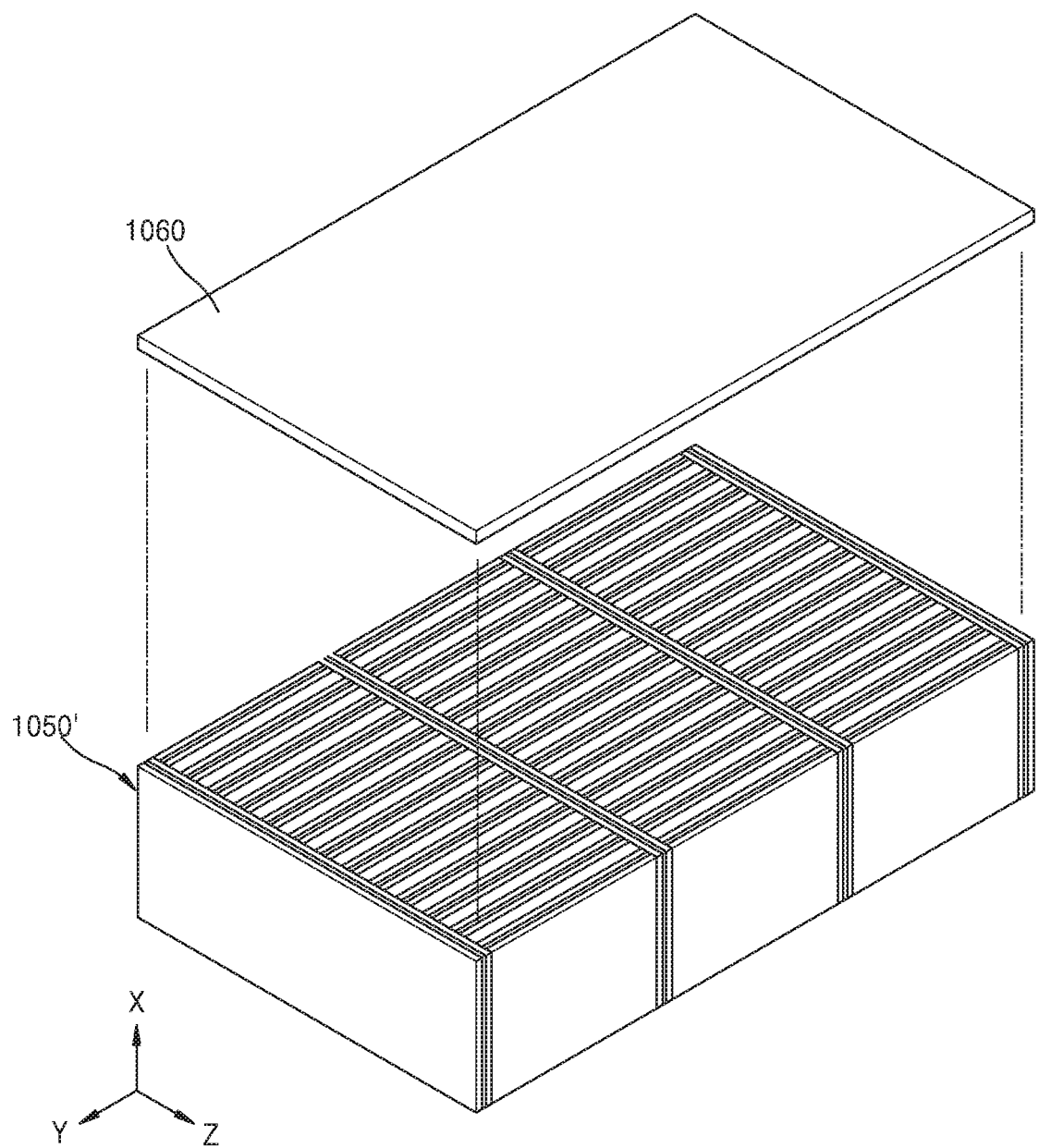
Figure 14K:
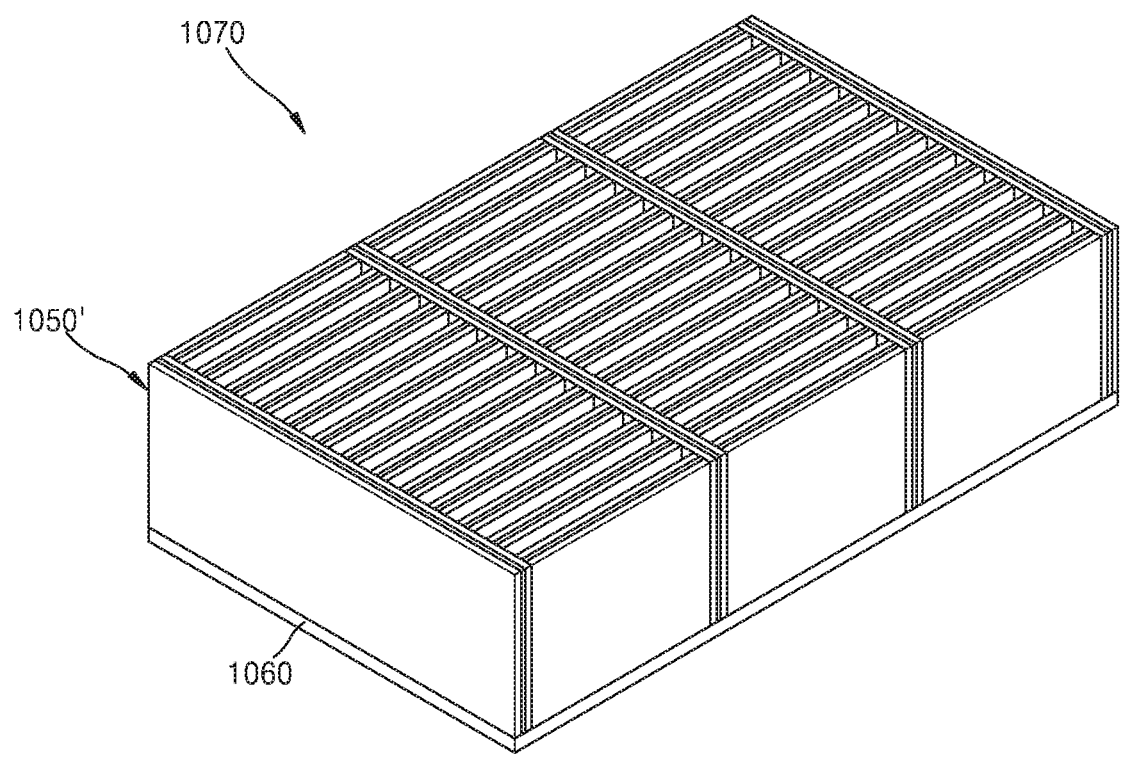
Figure 14L:
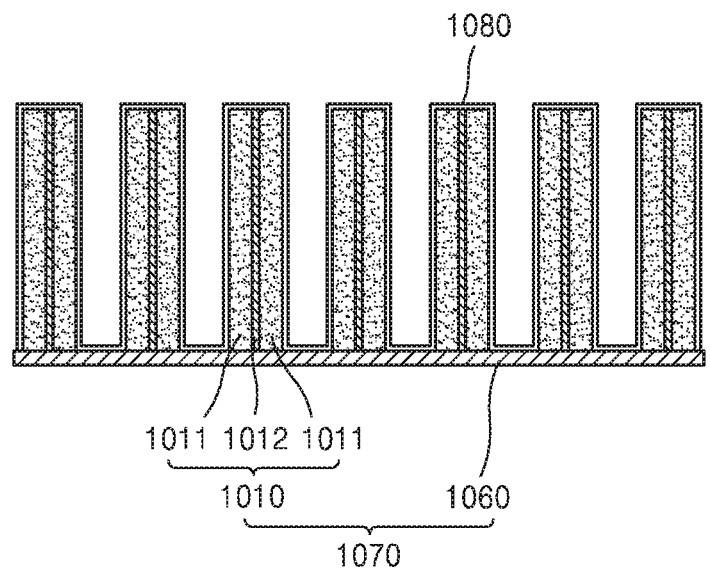
Figure 14M:
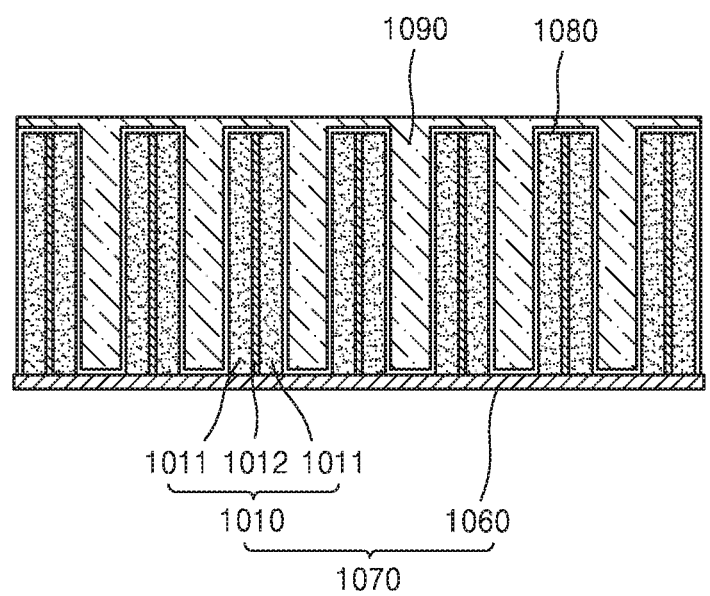
Figure 14N:
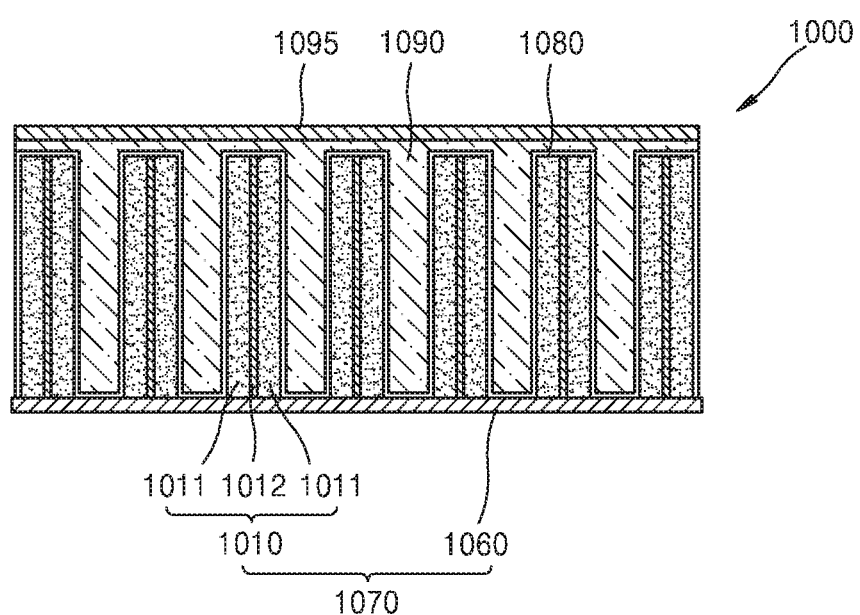

FIGS. 14A through 14N illustrate a method of manufacturing the battery 100 of FIG. 1 according to an exemplary embodiment.

FIG. 14A illustrates an apparatus (e.g., a grinder 1001) performing a ball milling and mixing operation. Referring to FIG. 14A, a ball milling and mixing operation is performed, in which materials for forming an active material sheet such as an active material, a dispersing agent, a solvent, a binder, a plasticizer or the like are input to the grinder 1001 and finely ground and mixed to prepare a slurry 1011. In an exemplary embodiment, the active material may be, for example, a cathode electrode active material powder such having a $LiMO_2$ composition (M=one of Co, Ni, and Mn or a combination of two or more of these).

Next, FIG. 14B illustrates an exemplary operation in which a first active material sheet is provided in a thick tape form by using a tape casting method. Referring to FIG. 14B, first, a moving belt 1002 is coated with the slurry 1011. The moving belt 1002 may be coated with the slurry 1011 with a uniform thickness by using, for example, a doctor blade. Next, the slurry 1011 coated on the moving belt 1002 may be dried to manufacture a first active material sheet 1011'. In order to effectively dry the slurry 1011, the slurry 1011 coated in a sheet form may be heated at a temperature equal to or lower than a glass transition temperature Tg of a binder.

Referring to FIG. 14, the first active material sheet 1011' may have a thickness of about 1 μm to about 30 μm, but is not limited thereto. The first active material sheet 1011' may be a cathode electrode active material sheet including a cathode electrode active material, a dispersant, a binder, a plasticizer or the like. While a method of manufacturing the first active material sheet 1011 by using a tape casting method is described above, the exemplary embodiments are not limited thereto, and the first active material sheet 1011' may be provided using various methods.

Next, referring to FIG. 14D, a sacrificial layer sheet 1020 is prepared. The sacrificial layer sheet 1020 may have a thickness of about 1 μm to about 50 μm, but is not limited thereto. The sacrificial layer sheet 1020 may be provided by forming a slurry including a sacrificial layer material, a dispersant, a solvent, a binder, a plasticizer or the like, in a sheet form, and removing the solvent by using a drying operation. An example of the sacrificial layer material may be $Li_2MSiO_4$ (M=one of Co, Ni, and Mn or a combination of two or more of these) that is removable by an etching solution such as hydrogen fluoride (HF, 0.5% to 20%), but is not limited thereto. Various types of sacrificial layer materials may be selected according to an etching solution. Furthermore, according to another example, various materials may be used as a sacrificial material according to a method of removing a sacrificial layer. In an exemplary embodiment, a material such as carbon (C) that is removable through a sintering operation or $Li_2CO_3$, LiCl which is removable through a melt-out process may be used as a sacrificial layer material, for example.

Referring to FIG. 14E, a first sheet stack structure 1030 is provided by alternately stacking a first active material sheet 1011', a first internal collector layer 1012, a first active material sheet 1011', and a sacrificial layer sheet 1020. The stacked structure including the first active material sheet 1011', the first internal collector layer 1012, and the first active material sheet 1011' may correspond to the structure of the first active material plates 112 and the first internal collector layers 113 (hereinafter referred to as a first active material composite sheet 1010). The first internal collector layer 1012 may be a cathode electrode collector layer. In an exemplary embodiment, the first internal collector layer 1012 may be provided by coating the first active material sheet 1011' with a paste including a collector material such as Au or Pd or an internal collector slurry, for example. In an exemplary embodiment, the first internal collector layer 1012 may be provided not only by printing a slurry or a paste but also using other methods such as sputtering an internal collector material or depositing an internal collector material by using a physical vapor deposition ("PVD") method such as evaporation.

In an exemplary embodiment, the first internal collector layer 1012 may have a thickness of about 1 μm along a Z direction, but is not limited thereto. According to XYZ coordinates, a stacking surface of the first sheet stack structure 1030 is substantially parallel to an XY plane, and a stacking direction of the first sheet stack structure 1030 is a Z direction. The number of times of stacking sheets of the first sheet stack structure 1030 may be one to several thousands of times, but is not limited thereto.

Also, referring to FIG. 14F, a partition wall composite sheet 1040 may be provided. The partition wall composite sheet 1040 may be provided by forming a partition wall internal collector layer 1042 on a partition wall sheet 1041 and stacking the partition wall sheet 1041 on the partition wall internal collector layer 1042. The partition wall sheet 1041 may be substantially the same sheet as the first active material sheet 1011' described above. However, according to another exemplary embodiment, the partition sheet 1041 may also include a first active material having a different composition from the first active material sheet 1011' or of a non-active material. The partition wall internal collector layer 1042 may be a cathode electrode collector layer. In an exemplary embodiment, the partition wall internal collector layer 1042 may be provided by coating the partition wall sheet 1041 with a paste including a collector material such as Au or Pd. In an exemplary embodiment, the partition wall internal collector layer 1042 may have a thickness of about 1 μm or less, for example, but is not limited thereto.

Next, when referring to FIG. 14G, a first electrode stack structure 1050 is provided by alternately stacking at least one first sheet stack structure 1030 and at least one partition wall composite sheet 1040. According to XYZ coordinates, at least one first sheet stack structure 1030 and at least one partition wall composite sheet 1040 are stacked in a Y direction. In other words, a surface of the first sheet stack structure 1030 in substantially parallel with a XZ plane is stacked on the partition wall composite sheet 1040. In an exemplary embodiment, the number of times of stacking the first sheet stack structure 1030 and the partition wall composite sheet 1040 may be, for example, one to several hundreds of times, but is not limited thereto.

Next, referring to FIG. 14H, the first electrode stack structure 1050 is sintered at a predetermined temperature. In an exemplary embodiment, a sintering temperature may be, for example, about 900 degrees Celsius (° C.) to about 1100° C., but is not limited thereto. According to the sintering operation above, the first electrode stack structure 1050 is sintered. That is, the first active material composite sheet 1010, the sacrificial layer sheet 1020, and the partition wall composite sheet 1040 are simultaneously sintered to form the first electrode stack structure 1050 that is sintered.

Next, referring to FIG. 14I, by dicing the sintered first electrode stack structure 1050 by using a cutter such as a blade 1003, the first electrode stack structure 1050 is split into a plurality of first electrode stack structures 1050'. A cutting direction of the first electrode stack structure 1050 is a Y direction, and a cross-section of the first electrode stack structure 1050' is in substantially parallel with a YZ plane. A height of the first active material plates 112 (refer to FIG. 1) and the partition walls 115 may be determined according to the cutting process described above.

Next, referring to FIG. 14J, a first electrode collector plate 1060 is disposed on the first electrode stack structure 1050'. The first electrode collector plate 1060 is disposed on a surface of the first electrode stack structure 1050'. In an exemplary embodiment, a top surface of the first electrode stack structure 1050' that is cut in the operation of FIG. 14J, and the first electrode collector plate 1060 is substantially parallel to a YZ plane of the first electrode stack structure 1050' according to XYZ coordinates. The first electrode collector plate 1060 may be provided by using, for example, a deposition method or a printing method.

Referring to FIG. 14K, the sacrificial layer 1020 (refer to FIG. 14E) is removed from the first electrode stack structure 1050' to which the first electrode collector plate 1060 is attached. The sacrificial layer 1020 may be removed by using a material that selectively etches only the sacrificial layer 1020 in a dry or wet manner. In an exemplary embodiment, when an active material of the first active material composite sheet 1010 and the partition wall composite sheet 1040 is $LiCoO_2$, and the sacrificial layer 1020 includes $Li_2CoSiO_4$, HF may be used as an etching material, for example. The etching material may vary according to the active material of the first active material composite sheet 1010 and the partition wall composite sheet 1040 or the material of the sacrificial layer 1020. By removing the sacrificial layer 1020, a first electrode structure 1070 having a 3D structure as illustrated in FIG. 14K is completed.

The first electrode structure 1070 may be manufactured using a different process from the above-described process.

In an alternative exemplary embodiment, while the first electrode stack structure 1050 is sintered and then cut in the above-described operations, for example, the first electrode stack structure 1050 may be first cut and then sintered.

As another example, while the first electrode collector plate 1060 is disposed on the cut first electrode stack structure 1050 and then the sacrificial layer 1020 is etched in the above-described operations, the sacrificial layer 1020 may be first etched from the first electrode stack structure 1050 and then the first electrode collector plate 1060 may be provided.

As another example, when an active material of the first active material composite sheet 1010 and the partition wall composite sheet 1040 is $LiCoO_2$, and the sacrificial layer 1020 includes a material that may be burned out during sintering, such as C, the sacrificial layer 1020 may be removed at the same time when sintering the first electrode structure 1070. In an exemplary embodiment, after forming the first electrode stack structure 1050 as illustrated in FIG. 14G, without performing a sintering operation, the first electrode stack structure 1050 may be immediately cut to portions having a predetermined thickness as illustrated in FIG. 14I, for example. Next, as illustrated in FIG. 14J, the first electrode collector plate 1060 is disposed on the first electrode stack structure 1050 to form the first electrode structure 1070 (from which the sacrificial layer 1020 is not yet removed), and then heat is applied to the first electrode structure 1070 to thereby remove the sacrificial layer 1020

(that is, burning out the sacrificial layer 1020) and sintering the first electrode structure 1070 at the same time. In an alternative exemplary embodiment, as illustrated in FIG. 14I, the first electrode stack structure 1050 may be cut first and then sintering and burn-out operations may be performed thereon, and the first electrode collector plate 1060 may be disposed on the sintered first electrode structure 1050.

As another example, when an active material of the first active material composite sheet 1010 and the partition wall composite sheet 1040 is $LiCoO_2$, and the sacrificial layer 1020 includes a material that may be burned out during sintering, such as $Li_2CO_3$ or LiCl, the sacrificial layer 1020 may be removed at the same time when the first electrode structure 1070 is sintered. That is, after forming the first electrode stack structure 1050 as illustrated in FIG. 14G, the first electrode stack structure 1050 may be immediately cut to portions having a predetermined thickness as illustrated in FIG. 14I without a sintering operation. Then the first electrode collector plate 1060 is disposed on the first electrode stack structure 1050 as illustrated in FIG. 14J so as to form the first electrode 1070 (from which the sacrificial layer 1020 is not yet removed). Next, heat may be applied to the first electrode structure 1070 so as to simultaneously remove the sacrificial layer 1020 (that is, melting out the sacrificial layer 1020) and sinter the first electrode structure 1070. Subsequently, a washing operation of washing a residue of the sacrificial layer 1020 may be performed. In an alternative exemplary embodiment, as illustrated in FIG. 14I, the first electrode stack structure 1050 may be cut first, and then a sintering operation, a melt-out operation, and a washing operation may be performed, and then the first electrode collector plate 1060 may be disposed on the sintered first electrode stack structure 1050.

A method of manufacturing the battery 100 (refer to FIG. 1) by using the first electrode structure 1070 manufactured in the above-described manner will be described below.

Referring to FIG. 14L, a solid electrolyte 1080 is disposed on the first electrode structure 1070. In an exemplary embodiment, the solid electrolyte 1080 may be deposited on a surface of the first active material composite sheet 1010 and a surface of the first electrode collector plate 1060 by using, for example, a chemical vapor deposition ("CVD") method, an atomic layer deposition ("ALD") method or a sputtering method. In an exemplary embodiment, the solid electrolyte 1080 may include amorphous ceramic such as lithium phosphorus oxynitride (LiPON). However, the material of the solid electrolyte 1080 is not limited thereto.

Referring to FIG. 14M, a second electrode structure 1090 is disposed on the solid electrolyte 1080. The second electrode structure 1090 may be provided to fill empty space of the first electrode structure 1070. In an alternative exemplary embodiment, the second electrode structure 1090 may not completely fill empty space of the first electrode structure 1070 but may be coated along a surface of the solid electrolyte 1080 in a serpentine manner. The second electrode structure 1090 may include an anode electrode active material. In an exemplary embodiment, the second electrode structure 1090 may include lithium, but is not limited thereto, for example. In an exemplary embodiment, the second electrode structure 1090 may be provided by, for example, depositing lithium on the solid electrolyte 1080 by using an evaporation method or by filling melted lithium in empty space of the first electrode structure 1070. However, the method of forming the second electrode structure 1090 is not limited thereto, and the second electrode structure 1090 may also be provided using other methods.

Referring to FIG. 14N, a battery 1000 is completed by forming a second electrode collector plate 1095 on the second electrode structure 1090. The second electrode collector plate 1095 is an anode electrode collector and may include, for example, Cu, but is not limited thereto.

According to the 3D electrode structure and the battery including the same according to the above-described exemplary embodiments, as the plurality of first active material plates and the plurality of second active material plates are respectively perpendicular to the first electrode collector layer and the second electrode collector layer, an energy density and rate characteristics of the battery may be both improved. In an exemplary embodiment, even when a height of unit cells of the battery is increased, since a reaction area also increases in proportion to the height, high rate characteristics may be maintained, for example. In addition, when the height of the unit cells of the battery is increased, a fraction of a cathode electrode active material and an anode electrode active material in the battery is increased to thereby increase an energy density of the secondary battery.

By arranging one or a plurality of partition walls substantially perpendicular to the plurality of first active material plates in a plan view while both of the partition walls and the first active material plates are substantially perpendicular to the first electrode collector plate in a cross-sectional view, the 3D structure of the first active material plates may be stabilized even when an aspect ratio (e.g., a height-to-thickness ratio) of the first active material plates is equal to or greater than about 10, for example.

When manufacturing the first electrode structure, due to the supporting structure of the partition walls, the first active material plates may not bend or collapse, and accordingly, uniform intervals between the first active material plates may be provided.

As the supporting structure of the partition walls is provided, deformation due to volume expansion of the first electrode structure and the second electrode structure may be prevented.

As the supporting structure of the partition walls is provided, uniform intervals between the first active material plates may be provided, and by stabilizing the structure of the first electrode structure, a lifetime of the battery may be increased.

The battery according to one or more exemplary embodiments may have a compact size, and thus may be appropriate as a battery of a compact device such as a mobile device or a wearable device.

It should be understood that exemplary embodiments described herein should be considered in a descriptive sense only and not for purposes of limitation. Descriptions of features or exemplary embodiments within each exemplary embodiment should typically be considered as available for other similar features or exemplary embodiments in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:
1. A three-dimensional electrode structure comprising:
an electrode collector plate;
a plurality of active material plates including active material, disposed on the electrode collector plate and protruding from the electrode collector plate; and a partition wall disposed on the electrode collector plate and perpendicular to the plurality of active material plates in a plan view; and an electrolyte layer disposed on the plurality of active material plates and covering a side surface of at least one of the plurality of active material plates which is perpendicular to an extension plane of the electrode collector plate, wherein the plurality of active material plates has a planar shape, wherein the partition wall is perpendicular to the electrode collector plate, and wherein the electrolyte layer is interposed between the electrode collector plate and an upper surface of the partition wall facing the electrode collector plate such that the electrolyte layer includes:

a first surface facing the electrode collector plate; and
a second surface opposite to the first surface and facing the upper surface of the partition wall, and wherein the first surface of the electrolyte layer and the second surface of the electrolyte layer are disposed on the upper surface of the partition wall.

2. The three-dimensional electrode structure of claim 1, wherein a plurality of partition walls is arranged at equidistant intervals in a length direction of the plurality of active material plates.

3. The three-dimensional electrode structure of claim 2, wherein the plurality of partition walls has a planar shape and is arranged in parallel with one another.

4. The three-dimensional electrode structure of claim 2, wherein the plurality of active material plates is perpendicular to the electrode collector plate in a cross-sectional view, and the plurality of partition walls is perpendicular to the electrode collector plate in the cross-sectional view and perpendicular to the plurality of active material plates in the plan view.

5. The three-dimensional electrode structure of claim 2, wherein the plurality of partition walls has the same height as those of the plurality of active material plates with respect to a planar surface of the electrode collector plate.

6. The three-dimensional electrode structure of claim 1, wherein the partition wall and the plurality of active material plates comprise active materials of a same composition or different compositions.

7. The three-dimensional electrode structure of claim 1, wherein the partition wall comprises a non-active material.

8. The three-dimensional electrode structure of claim 1, further comprising a partition wall internal collector layer disposed inside the partition wall and electrically contacting the electrode collector plate, the partition wall internal collector layer comprising an electronic conductor.

9. The three-dimensional electrode structure of claim 8, wherein the partition wall internal collector layer has a planar shape protruding and extending from a planar surface of the electrode collector plate.

10. The three-dimensional electrode structure of claim 8, wherein the partition wall internal collector layer is inside the partition wall in parallel with the partition wall.

11. The three-dimensional electrode structure of claim 8, wherein the partition wall internal collector layer is inserted into the partition wall, and two surfaces of the partition wall internal collector layer contact the partition wall.

12. The three-dimensional electrode structure of claim 8, wherein a first end portion of the partition wall internal collector layer contacts the electrode collector plate, and a second end portion of the partition wall internal collector layer, which is opposite to the first end portion, contacts the electrolyte layer or is disposed inside the partition wall.

13. The three-dimensional electrode structure of claim 1, wherein the plurality of active material plates is arranged at equidistant intervals on the electrode collector plate.

14. The three-dimensional electrode structure of claim 1, further comprising an internal collector layer disposed inside the plurality of active material plates and electrically contacting the electrode collector plate, the internal collector layer comprising a conductor.

15. The three-dimensional electrode structure of claim 1, wherein the electrode collector plate comprises a conductor.

16. The three-dimensional electrode structure of claim 1, further comprising an active material base layer provided on a surface of the electrode collector plate, on which the plurality of active material plates are disposed.

17. A battery comprising:
a first electrode structure;
an electrolyte layer provided on the first electrode structure; and
a second electrode structure on the electrolyte layer such that the electrolyte layer is interposed between the first and second electrode structures;
wherein the first electrode structure comprises:
an electrode collector plate;
a plurality of first active material plates disposed on the electrode collector plate and protruding from the electrode collector plate; and
a plurality of partition walls disposed on the electrode collector plate and perpendicular to the plurality of active material plates in a plan view,
wherein the plurality of first active material plates has a planar shape,
wherein the partition wall is perpendicular to the electrode collector plate,
wherein the electrolyte layer is interposed between the electrode collector plate and an upper surface of the partition wall facing the electrode collector plate such that the electrolyte layer includes:
a first surface facing the electrode collector plate; and
a second surface opposite to the first surface and facing the upper surface of the partition wall, and
wherein the first surface of the electrolyte layer and the second surface of the electrolyte layer are disposed on the upper surface of the partition wall.

18. The battery of claim 17, wherein the second electrode structure comprises a plurality of second active material plates which are alternately arranged with respect to the plurality of first active material plates of the first electrode structure,
wherein the plurality of second active material plates and the plurality of first active material plates of the first electrode structure are respectively spaced apart from each other.

19. The battery of claim 17, wherein the first electrode structure comprises a cathode electrode, and the second electrode structure comprises an anode electrode.

20. The battery of claim 17, wherein the first electrode structure, the electrolyte layer, and the second electrode structure define a first battery cell layer,
wherein a plurality of first battery cell layers is stacked in the battery.

* * * * *